United States Patent
Marsh et al.

(10) Patent No.: US 10,280,523 B2
(45) Date of Patent: May 7, 2019

(54) HIGH PRESSURE GAS SYSTEM

(71) Applicants: Stephen Alan Marsh, Carlisle, MA (US); Donald Merrill Parker, Marblehead, MA (US)

(72) Inventors: Stephen Alan Marsh, Carlisle, MA (US); Donald Merrill Parker, Marblehead, MA (US)

(73) Assignee: Encite LLC, Burlington, MA (US)

( * ) Notice: Subject to any disclaimer, the term of this patent is extended or adjusted under 35 U.S.C. 154(b) by 182 days.

(21) Appl. No.: 15/290,121

(22) Filed: Oct. 11, 2016

(65) Prior Publication Data

US 2017/0121830 A1    May 4, 2017

Related U.S. Application Data

(63) Continuation of application No. 13/623,689, filed on Sep. 20, 2012, now Pat. No. 9,464,356.
(Continued)

(51) Int. Cl.
*C25B 1/12* (2006.01)
*C02F 1/46* (2006.01)
(Continued)

(52) U.S. Cl.
CPC .............. *C25B 1/12* (2013.01); *C02F 1/461* (2013.01); *C25B 1/04* (2013.01); *C25B 1/10* (2013.01);
(Continued)

(58) Field of Classification Search
CPC ...... C25B 1/02–1/12; C25B 9/18; C25B 1/04; C25B 1/10; C25B 9/10; C02F 1/461; C02F 2201/46115; C02F 2301/06; C02F 2303/10; Y02W 10/30; Y02E 60/324; Y02E 60/364; Y02E 60/366
See application file for complete search history.

(56) References Cited

U.S. PATENT DOCUMENTS

| | | |
|---|---|---|
| 4,214,954 A | 7/1980 | Kuo |
| 5,037,518 A | 8/1991 | Young et al. |

(Continued)

FOREIGN PATENT DOCUMENTS

| | | |
|---|---|---|
| EP | 0 296 635 A1 | 12/1988 |
| WO | WO 94/05831 A1 | 3/1994 |

OTHER PUBLICATIONS

International Search Report from PCT/US2012/056504, dated Feb. 4, 2013, 4 pgs.
(Continued)

*Primary Examiner* — Ciel P Thomas
(74) *Attorney, Agent, or Firm* — Fish & Richardson P.C.

(57) ABSTRACT

Among other things, a device for use in electrolyzing water is described. The device comprises an electrolysis unit that includes a chamber, an ion exchange structure in the chamber, a cathode, an anode, a high pressure chamber, and a reservoir. The chamber is separated by the ion exchange structure into a first compartment and a second compartment. The cathode is in the first compartment and the anode in the second compartment. The reservoir is disposed in the high pressure chamber for storing water to be supplied to the chamber of the electrolysis unit. In some implementations, the ion exchange structure is a proton exchange membrane.

20 Claims, 20 Drawing Sheets

Related U.S. Application Data

(60) Provisional application No. 61/537,310, filed on Sep. 21, 2011.

(51) Int. Cl.
  *C25B 1/10* (2006.01)
  *C25B 1/04* (2006.01)
  *C25B 9/18* (2006.01)
  *C25B 9/10* (2006.01)
  *H01M 8/06* (2016.01)
  *C02F 1/461* (2006.01)
  *H01M 8/0656* (2016.01)

(52) U.S. Cl.
  CPC .......... *C25B 9/10* (2013.01); *C25B 9/18* (2013.01); *H01M 8/0656* (2013.01); *C02F 2201/46115* (2013.01); *C02F 2301/06* (2013.01); *C02F 2303/10* (2013.01); *Y02E 60/324* (2013.01); *Y02E 60/364* (2013.01); *Y02E 60/366* (2013.01); *Y02W 10/30* (2015.05)

(56) References Cited

U.S. PATENT DOCUMENTS

| | | | |
|---|---|---|---|
| 6,312,846 | B1 | 11/2001 | Marsh |
| 6,554,978 | B1 | 4/2003 | Vandenborre |
| 8,834,700 | B2 | 9/2014 | Marsh |
| 9,464,356 | B2 * | 10/2016 | Marsh ............... C02F 1/461 |
| 2006/0254907 | A1 | 11/2006 | Taruya et al. |
| 2007/0138025 | A1 | 6/2007 | Lee et al. |
| 2007/0151865 | A1 | 7/2007 | Shimko et al. |
| 2007/0251829 | A1 | 11/2007 | Marsh |
| 2007/0287043 | A1 | 12/2007 | Marsh et al. |
| 2011/0042228 | A1 | 2/2011 | Hinatsu et al. |
| 2011/0220039 | A1 | 9/2011 | Nowicki et al. |

OTHER PUBLICATIONS

International Preliminary Report Patentability from PCT/US2012/056504, dated Apr. 3, 2014, 6 pgs.

European Search Report Appln. No. 12834200.3, PCT/US2012/056504, dated Feb. 27, 2015, 13 pgs.

* cited by examiner

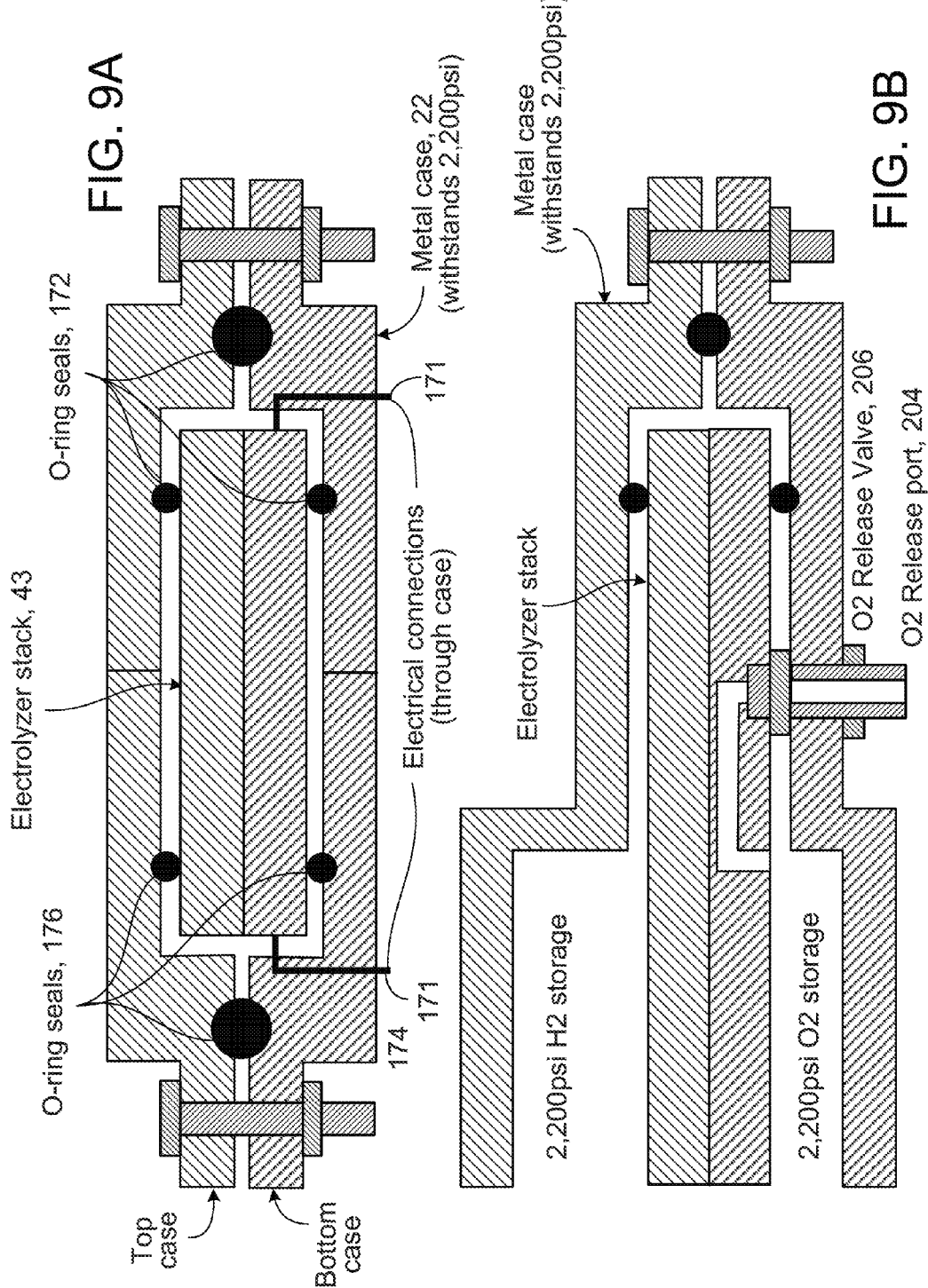

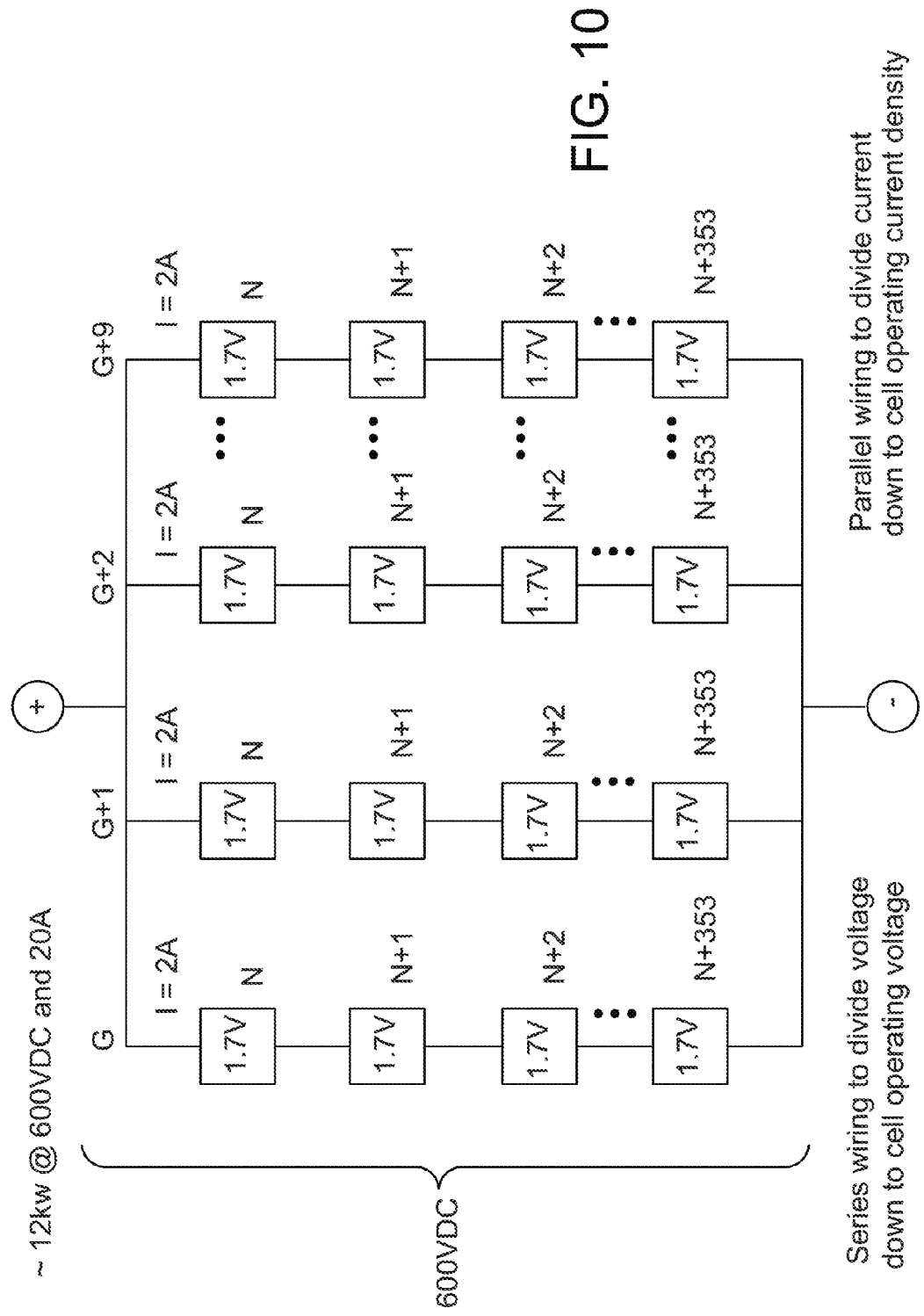

| # | State Name | H2O Fill Valve | O2 Release Valve | Isolation Valve |
|---|---|---|---|---|
| 1 | Off | Closed | Closed | Closed |
| 2 | H2Ofill | Open | Closed | Closed |
| 3 | Electrolyze | Closed | Modulate | Open |
| 4 | Store | Closed | Closed | Closed |
| 5 | Use | Closed | Modulate | Open |

FIG. 12

State 1: off
State 2: fill until water pressure sensor detects "full" pressure
State 3: modulate O2 release valve to keep the delta P across the membrane at zero, as H2 pressure increases
State 4: same as off state
State 5: modulate O2 release valve to keep the delta P across the membrane at zero, as H2 pressure decreases

HIGH PRESSURE GAS SYSTEM

BACKGROUND

This application relates to high pressure gas systems.

Hydrogen gas carries energy and can be used, e.g., in a fuel cell, to make electricity. Hydrogen gas can be generated in various ways. For example, water can be electrolyzed into oxygen and hydrogen using a so-called Hofmann voltammeter. However, to effectively use the generated hydrogen gas, particularly for off-line use, the generated hydrogen gas from the Hofmann voltammeter needs to be stored. Such off-line use, e.g., is for use at a time and/or location different from when/where the hydrogen was generated. Generally, to store the hydrogen gas it is desired to store it at a high density. However, to store hydrogen gas at a high density requires compression of the gas to a high pressure, e.g., up to several thousand pounds per square inch (psi). To achieve the desired hydrogen density, multi-stage compression is used to provide the high pressure compression by using, e.g., a hydraulic ram, in an oil-free and clean manner.

SUMMARY

Described are high pressure electrolysis devices/systems that compress hydrogen gas. Hydrogen gas is compressed within the electrolysis device/system without the need for significant power for compression. Exemplary ranges of compression of hydrogen are typically up to about 10,000 psi, e.g., in a range of about 1,800 psi to 2,400 psi. Other ranges are possible. In addition to compressing hydrogen, the device can also compress oxygen. Having compressed the gas(es) the gas or gases are available for high pressure storage in tanks and the like.

Use of this electrolysis device/system obviates the need for any external compressors saving energy that would otherwise go to compress the hydrogen gas before the hydrogen gas is stored at the high pressure. Compression ranges are determined based on application of the system or other considerations such as safety. Tensile strengths of the various materials used in forming the electrolysis device/system are selected in order to enable the system to withstand the desired compression ranges with a safety margin. Described herein are embodiments of high pressure electrolysis systems for generating and storing hydrogen gas. The high pressure electrolysis systems include one or more stacks of silicon-based MEMS wafers with integrated controls, e.g., on the wafers.

According to an aspect, a device for electrolyzing water includes an electrolysis unit, that includes a chamber and an ion exchange structure in the chamber, the ion exchange structure including an ion exchange member that is configured to separate the chamber into a first compartment and a second compartment, a cathode disposed on a first portion of the ion exchange member and that is located in the first compartment, and an anode disposed on a second, different portion of the ion exchange member and that is located in the second compartment. The device also includes a case at least partially enclosing a high pressure chamber that receives hydrogen gas that results from the electrolysis of water in the ion exchange structure and a reservoir in fluid communication with the chamber of the electrolysis unit, the reservoir disposed in the high pressure chamber and the reservoir configured to store water that is supplied to the chamber of the electrolysis unit.

The device may include one or more of the following features.

The ion exchange structure includes a proton exchange membrane. The case is further configured to enclose the electrolysis unit and reservoir. The ion exchange structure is a first ion exchange structure. The device further includes a plurality of ion exchange structures including the first ion exchange structure in the chamber. The device further includes a hydrogen release port in fluid communication with the first compartment. The device further includes an oxygen release port in fluid communication with the second compartment. The device further includes a second high pressure chamber that receives oxygen gas that results from the electrolysis of water in the ion exchange structure, the second high pressure chamber in fluid communication with an external environment. The device further includes a release valve disposed in second high pressure chamber to control egress of oxygen from the second high pressure chamber to the external environment. The high pressure chamber is in fluid communication with an external environment and is in fluid isolation from the first compartment. The high pressure chamber is in fluid communication with an external environment and direct fluid communication with the first compartment.

According to an additional aspect, a device for use in electrolyzing water includes an electrolysis unit, comprising a plurality of substrates. A first substrate provides an electrolyzer, the first substrate forming a chamber and a channel formed in the first substrate for delivering water to the chamber, at least one ion exchange structure in the first chamber, the ion exchange structure including an ion exchange member that is configured to separate the chamber into a first compartment and a second compartment the ion exchange member including a porous substrate, a cathode disposed on a first portion of the ion exchange member and that is located in the first compartment and an anode disposed on a second, different portion of the ion exchange member and that is located in the second compartment. The device also includes a case at least partially enclosing a high pressure chamber that receives hydrogen gas that results from the electrolysis of water in the ion exchange structure, the high pressure chamber in fluid communication with an external environment and a reservoir in fluid communication with the chamber of the electrolysis unit, the reservoir disposed in the high pressure chamber and the reservoir configured to store water that is supplied to the chamber of the electrolysis unit.

The device may include one or more of the following features.

The reservoir is in the high pressure chamber and comprises a spring loaded bladder. There is a second substrate bonded, e.g., anodically, to the first substrate to create gas channels. The cathode and the anode can be in the form of dendrites and the material of the substrate is silicon or a glass or a ceramic. The device includes a first set of via conductors disposed in the first substrate in electrical contact with the cathodes and a second set of via conductors disposed in the first substrate in electrical contact with the anode. . A first liquid-gas separator and a second liquid-gas separator are supported by the second substrate. The first liquid-gas separator is in fluid communication with the first compartment, and the second liquid-gas separator is in fluid communication with the second compartment. Additional units each including an ion exchange structure are formed as an integral part of the first silicon substrate, a cathode and an anode. The chamber, the ion exchange structures of the units and the channel are formed by etching a single crystal silicon wafer. The ion exchange structures are porous. The units are electrically connected in serial, in parallel, or in a combination of serial and parallel.

According to an additional aspect, a device for use in electrolyzing water includes a reservoir for storing water, a chamber containing an ion exchange structure for electrolyzing the water, and a case (pressure vessel) housing the reservoir and the silicon substrate(s). The case comprises a gas release port and a gas return port. The device also includes a storage tank in fluid communication with the gas release port and the gas return port. The chamber and the ion exchange structure are formed integrally in a silicon substrate.

The device may include one or more of the following features.

An internal pressure in the chamber, the reservoir and the storage tank is about 2,000 psi to about 5,000 psi. The pressure inside and outside the reservoir and in the case are substantially the same. A spring is provided between the case and the reservoir. A sensor is provided to sense the pressure in the chamber. The device includes one or more sensors to sense the differential pressure of the chamber compartments. The device includes a processor that receives signals from the sensors. The processor is configured to operate and control the device.

According to an additional aspect, a device for use in electrolyzing water includes a first stack substrate that includes a first silicon substrate and a second silicon substrate. The first silicon substrate comprises at least two ion exchange structures formed as an integral part of the first silicon substrate in a chamber formed in the first silicon substrate, and gas channels formed in the first silicon substrate. The second silicon substrate comprises gas channels. The second silicon substrate has a first surface anodically bonded to the first silicon substrate. The gas channels in the second silicon substrate are in fluid communication with the gas channels of the first silicon substrate.

The device may also include one or more of the following features. The device includes a second stack substrate being the same as the first stack substrate. The second stack substrate and the first stack substrate are anodically bonded together. The device includes a top stack substrate and a bottom stack substrate, the top stack substrate bonded to the either the first or second stack with the top stack substrate bonded to the other one of the top and bottom stack substrates.

According to an additional aspect, a device for use in electrolyzing water includes a stack that includes a first silicon substrate, a second silicon substrate, a third substrate, and a fourth substrate. The first silicon substrate comprises at least two ion exchange structures formed as an integral part of the first silicon substrate in a chamber formed in the first silicon substrate, and gas channels formed in the first silicon substrate. The second silicon substrate comprises gas channels. The second silicon substrate has a first surface anodically bonded to the first silicon substrate. The gas channels in the second silicon substrate are in fluid communication with the gas channels of the first silicon substrate. The third silicon substrate comprises at least two ion exchange structures formed as an integral part of the third silicon substrate in a chamber formed in the third silicon substrate, and gas channels formed in the third silicon substrate. The second silicon substrate further has a second surface anodically bonded to the third silicon substrate. The fourth silicon substrate comprises gas channels. The fourth silicon substrate has a first surface anodically bonded to the third silicon substrate. The gas channels in the fourth silicon substrate are in fluid communication with the gas channels of the third silicon substrate.

The device may also include one or more of the following features.

The device includes a top stack substrate and a bottom stack substrate, the top stack substrate bonded to the either the first or second stack with the top stack substrate bonded to the other one of the top and bottom stack substrates.

The details of one or more embodiments of the invention are set forth in the accompanying drawings and the description below. Other features, objects, and advantages of the invention are apparent from the description and drawings, and from the claims.

DESCRIPTION OF DRAWINGS

FIGS. 9A-9C are schematic cross-sectional views of the electrolysis stack in a pressure vessel case.

FIG. 10 is an electrical wiring diagram of units (shown in blocks) of the electrolysis system.

FIG. 12 is a diagram showing different operational components of the electrolysis system.

DETAILED DESCRIPTION

Figure 1A:
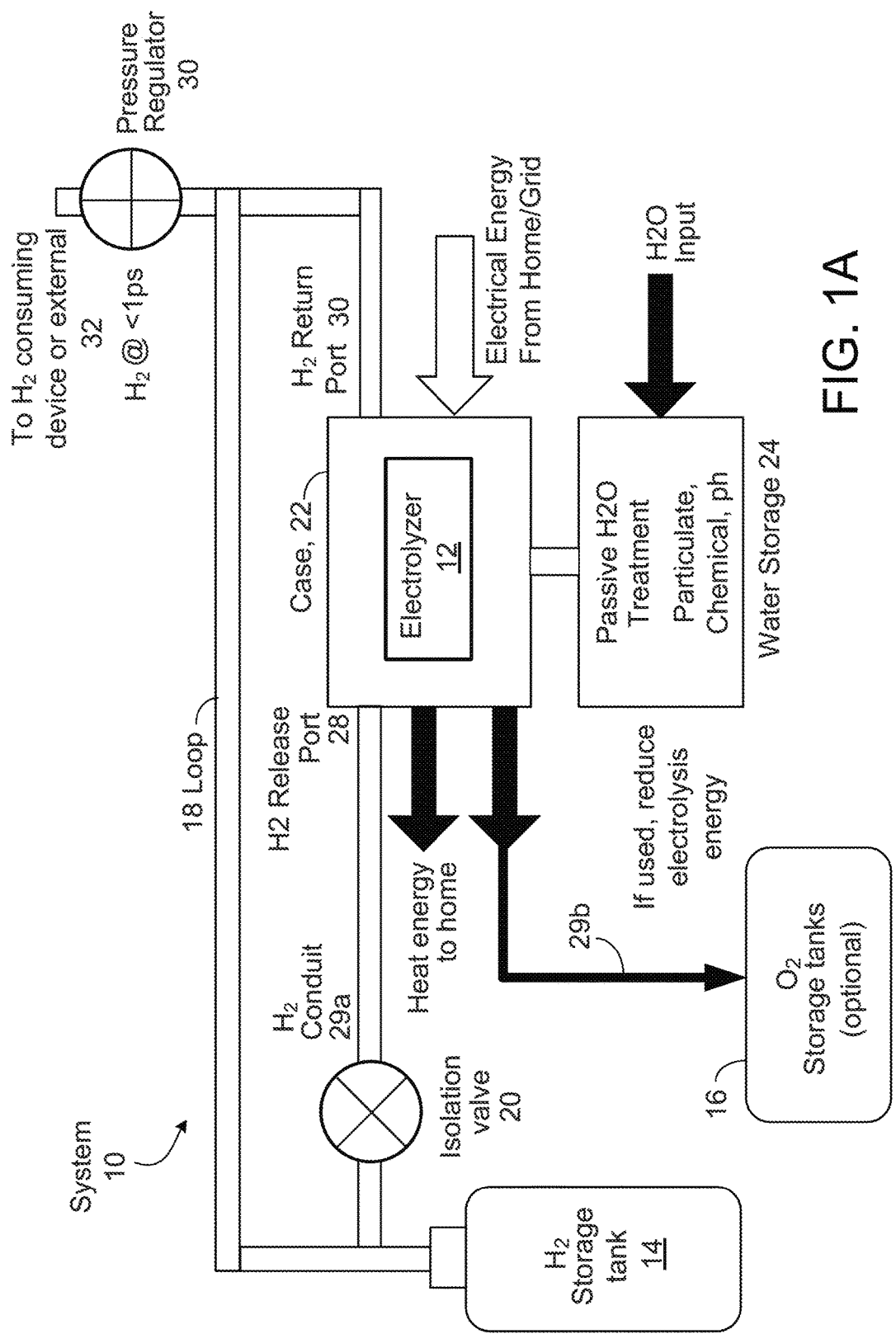
FIGS. 1A and 1B are block diagrams of high pressure electrolysis systems.

Referring to FIG. 1A, a high pressure electrolysis system 10 includes an electrolyzer 12 that is connected to one or more storage tanks 14, 16 of which one is connected via a gas conduit loop 18 between that storage tank 14 and the electrolyzer 12. The high pressure electrolysis system 10 is isolated from an external environment using valves or other devices 20. During electrolysis, the electrolyzer 12 continuously electrolyzes (separates) water into hydrogen ($H_2$) and oxygen ($O_2$). As the hydrogen and oxygen gases accumulate, the internal pressure of the high pressure electrolysis system 10 increases, reaching about 500 psi to 10,000 psi, about 1,000 psi to 5,000 psi, or about 2,000 psi and/or up to about 5,000 psi. As an example, the system 10 can be configured to store hydrogen gas at about 2000 psi described. For other pressures, the system 10 would be basically the same, with modifications being made to valves, etc. configured for such other pressures, etc. as will become apparent in the discussion below. The hydrogen gas is stored in the storage tank at a high internal pressure without the need for an external compressor device to compress the gas. The tank has its own valve (not shown). Elimination of the compressor device provides a system that is more energy efficient by eliminating the need for a significant amount of energy to drive the compressor to compress the gas to the elevated pressure.

The electrolyzer 12, the loop gas conduit 18, and the storage tank 20 are connected (using O-rings, valves, or other approaches) and made of materials that can withstand the high internal pressures that will be encountered. In particular, as explained in detail further below, in some embodiments, the electrolyzer 12 includes one or more electrolysis stacks (not shown) formed of one or more silicon wafer substrates, e.g., single crystal silicon, and disposed in a case 22 that can withstand high pressures (a high pressure vessel case 22 is discussed below in conjunction with FIGS. 9A-9C). Alternative materials include glasses, ceramics and other materials that have comparable strengths, are electrically non-conductive, and that are or can be treated, to be porous. The high pressure vessel case 22 has a high strength to contain the gas at a high pressure within the case. Various materials can be used, provided the material has the necessary tensile strength, etc. for the particular pressure.

Prior to electrolysis, the electrolyzer 12 receives and stores water from an external water treatment/storage device 24. After the electrolyzer receives the water, port(s) that deliver the water are sealed, e.g., via valves or other mechanisms (not shown). The water storage device 24 can receive water from, e.g., domestic water supply and provides passive water treatment, including chemical or pH adjustment, or reduction of particulate materials, as needed. In some implementations, water from domestic water supply is provided to the storage device 24 and is conditioned. For example, the water first undergoes particulate filtering to remove small particulates in the water. The particulate filtering can include multiple steps and can remove particles having dimensions larger than 1 micron. The removal of the particles prevents clogging of micro channels in the electrolyzer 12 of high pressure electrolysis system 10. The water can further be chemically filtered. This removes unwanted chemicals such as dissolved minerals, e.g., salts, etc. Additionally, the pH of the filtered water can be adjusted to a value for efficient electrolysis. In some implementations, the water stored at the water storage device 24 and provided to the electrolyzer 12 has a pressure of the domestic water supply, e.g., 60 psi or other pressures for which the domestic water supply is supplied.

The generated high pressure hydrogen and oxygen gases are delivered from the electrolyzer 12 through separate conduits such as conduit 29a for the hydrogen and conduit 29b for oxygen to one or more storage tanks 14, 16 for each of the hydrogen and oxygen, respectively. The storage tanks 14, 16 are standard, commercially available, high pressure gas cylinders. For applications where the production of hydrogen is for a fuel cell, often the oxygen will not be stored, but will be vented, as discussed below. The hydrogen gas from the storage tank 14 can be supplied to a hydrogen gas consuming device, such as a fuel cell. The gas conduit loop 18 between the storage tank 14 and electrolyzer 12 receives hydrogen from the hydrogen release port 28 to simultaneously fill the storage tank and direct hydrogen back into the pressure vessel case 22 through a hydrogen return port 30. The conduit loop 18 balances the high internal pressure of the electrolysis stacks and the pressure external to the electrolysis stacks within the vessel case 22 (discussed further below). In addition, a pressure regulator 30 is used to reduce the high pressure of the storage tank 14 for delivery to the fuel cell, via output port 32.

The system 10 shown in FIG. 1A can be located at the same location as the hydrogen gas consuming device. In some implementations, the isolation valve 20 is used to isolate the electrolysis stack (electrolyzer 12) from the $H_2$ storage tank 14. An example of the isolation valve is a pressure-rated, electrically-controlled solenoid valve. When a sufficient amount of hydrogen gas is generated and stored in the storage tank 14, the storage tank 14 can be separated from the electrolyzer 12. The storage tank 14 can then be moved to any desired location to supply the hydrogen gas to gas consuming devices (not shown). The high pressure electrolyzing system 10 can be powered by electrical energy from a grid or from other sources, e.g., solar or wind. The generated $H_2$ gas represents stored energy that can be used at a later time.

Figure 2A:
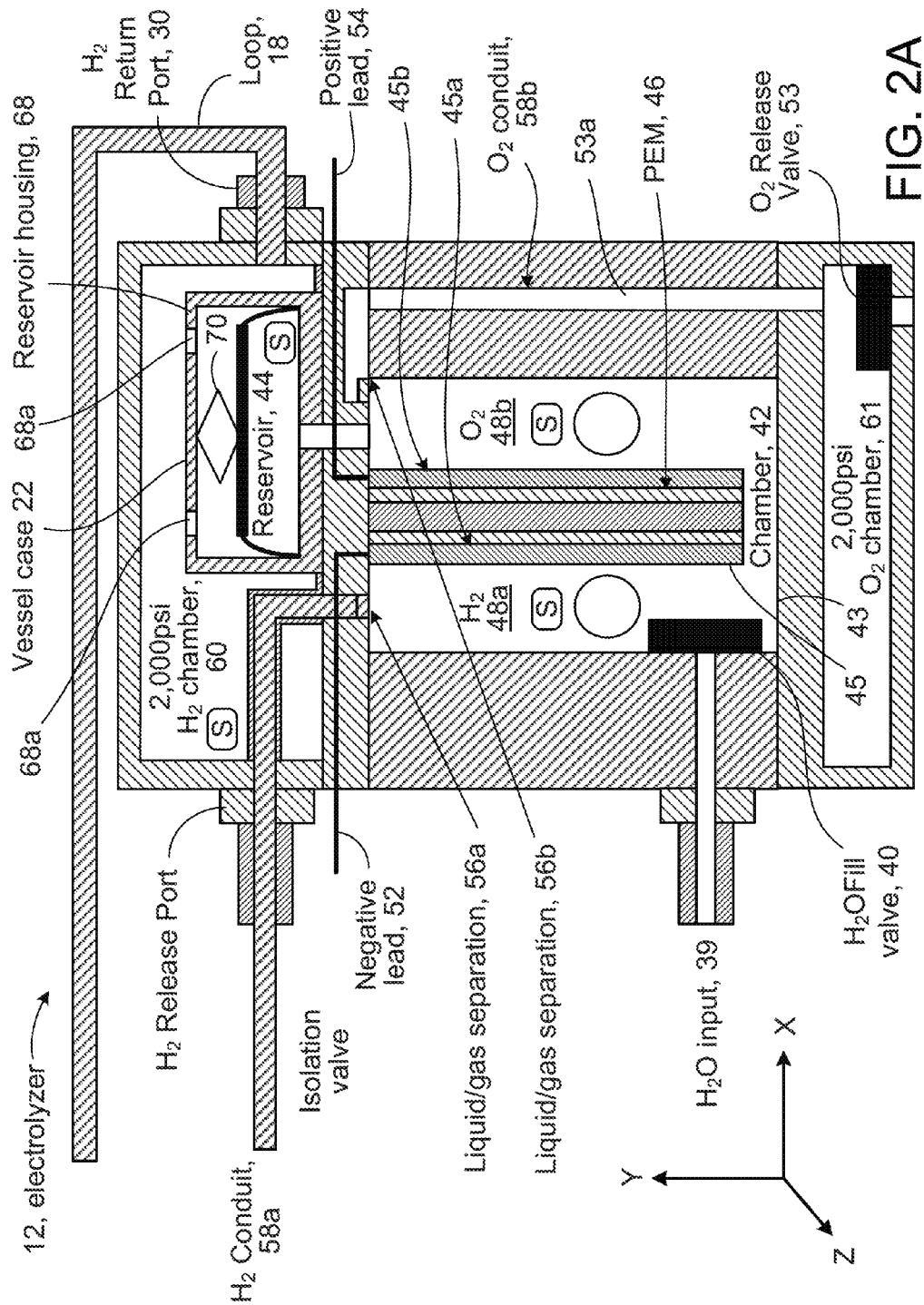
FIGS. 2A and 2B are block diagrams showing electrolyzer units for high pressure electrolysis systems.

Referring to FIG. 2A one example of an electrolyzer 12 connected to the conduit loop 18 is shown. The electrolyzer 12 includes a water input channel 39 controlled by a water fill valve 40. When a valve 40 is open, water, e.g., domestic water at a pressure of about 60 psi, fills an electrolyzer chamber 42 and a reservoir 44. The electrolyzer chamber 42 can be purged of extraneous gas during a water fill operation via the $O_2$ conduit 53a and release valve 53. The reservoir 44 stores a desired quantity of water. In addition to capacity considerations the quantity of water depends on the amount of hydrogen that is desired to be produced, e.g., about 1 liter to about 12 liters. An additional amount of water is introduced into the electolyzer 12 to fill the chamber and conduits therein. Other ranges are possible depending on specific requirements and the specific configuration of the system 10. After the reservoir 44 is fully filled, the water fill valve 40 is closed. The electrolyzer 12 includes an ion exchange structure 45 including, e.g., a proton exchange membrane 46 (PEM) in the electrolyzer chamber 42. The membrane 46 provides two connected compartments 48a, 48b in the chamber. The compartments are connected at the bottom of the membrane 46 that is configured to have a length that is shorter than the height of the chamber 42.

Although only one ion exchange structure 45 is shown, the electrolyzer 12 can include plural ion exchange structures 45 along all directions, e.g., x, y, z directions. Details of such embodiments are discussed further below. For convenience of discussion, an electrolyzer unit 43 of the electrolyzer 12 has one chamber that is separated into two adjacent compartments 48a, 48b by the PEM membrane 46 on the ion exchange structure 45. Multiple electrolyzer units 43 of the same electrolyzer 12 can share the same reservoir 44, water fill valve 40, water input channel 39, or use different reservoirs, valves, or channels, as required by specifics of an application.

In the example shown in FIG. 2A, water is filled into the chambers 42 and reservoir(s) 44 of a electrolyzer unit 43. Multiple such electrolyzer unit 43 are filled through water fill holes 50 between units, i.e., stacks (one stack shown). The electrolyzer unit 43 can be formed in one substrate, e.g., silicon wafer, or in multiple stacked substrates, as will be detailed below. In some implementations, units within one substrate do not have separation walls to separate adjacent units (see, e.g., FIG. 4) (i.e., the units have shared chambers).

The ion exchange structure 45 is made of a porous material, such as porous silicon, to allow ions, e.g., protons, to pass across the structure. The ion exchange structure 45 is gas impermeable so that neither hydrogen gas nor oxygen gas can pass across the membrane 46. In some implementations, the pores in the ion exchange structure are small, e.g., micropores or nanopores to prevent gas bubbles from passing through the ion exchange structure. The ion exchange structure has water paths indicated by arrows (not numbered) in pores of the ion exchange structure 45 to allow ions to pass across the structure. The ion exchange structure 45 is sufficiently thin to reduce the ionic resistance in the path and is sufficiently thick to prevent excessive gas diffusion across the structure. Significant gas diffusion across the structure corresponds to a loss in electrolysis efficiency, and thus such diffusion should be minimized.

On both lateral sides of the ion exchange structure 45, metal, e.g., platinum or gold, layers are formed. A metal layer 45a, on one side is connected to a negative lead 52 to act as a cathode, and the other metal layer 45b is formed and connected to a positive lead 54 to act as an anode. Each compartment 48a, 48b of the unit 12 is associated with one of those electrodes. When a voltage difference is applied between the two metal layers 45a, 45b, water is electrolyzed at the surfaces of the metal coatings to produce hydrogen at the cathode in one compartment 48a and oxygen at the anode in the other compartment 48b.

To enhance electrolysis, the metal coatings can be in a "dendritic form" to provide large surface areas for contacting water. In addition, the metals may also be one or more catalysts to facilitate the electrolysis and to provide an electrical path for the electrons in the reaction. In some implementations, the catalyst may be supported in/on the electrode or the electrode can be made of the catalyst material which is configured to support a substantial current density without blocking the ion migration through the ion exchange structure.

The produced hydrogen and oxygen remain separated in their respective compartments of the electrolyzer chamber 42, and are directed through different gas channels to different gas chambers 60, 61 and or tanks for storage or use. Liquid-gas separators 56a, 56b, e.g., separation membranes, are placed between each channel and the electrolyzer compartments 48a, 48b. Such separators are permeable gas and impermeable to water so that the gases, i.e., hydrogen and oxygen, penetrate the separator into the respective conduits 58a, 58b, while water is stopped by the separators from entering the conduits 58a, 58b. Several types of liquid gas separators can be used. For example porous silicon can be used with controlled size treated to be hydrophobic. Alternatively, can insert a piece of plastic polymer, such as Teflon treated by plasma or etching to produce small size holes. In some implementations, the liquid-gas separators have hydrophobic surfaces. The oxygen gas can be released without storage, e.g., when there is no intended use for oxygen. The gas production increases the pressure within the reservoir 44, the electrolyzer 12, and the storage tanks 14 (see, FIG. 1A).

Figure 11:
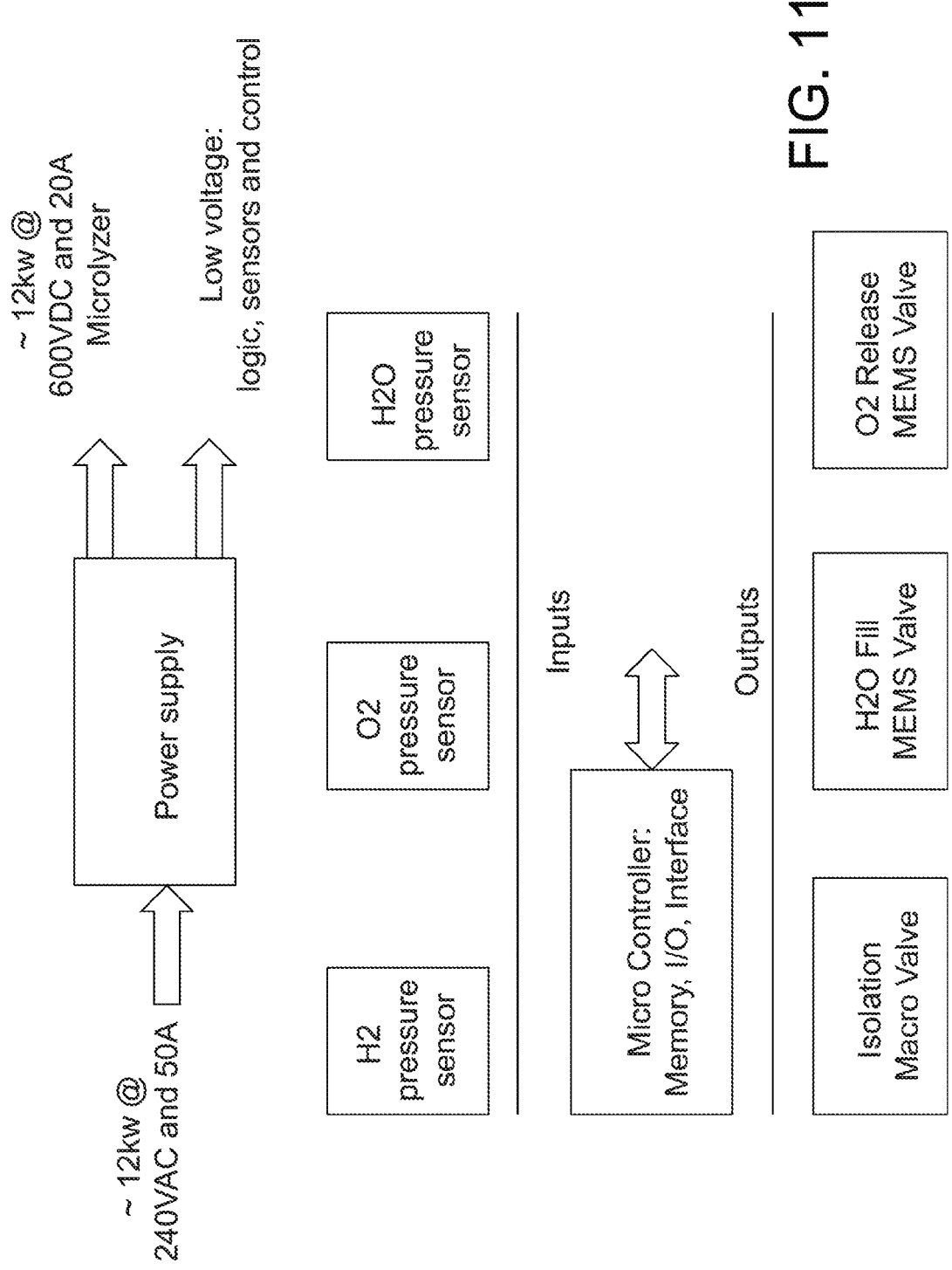
FIG. 11 is a block diagram of user interaction with an electrolysis system.

In some implementations, the internal pressure of the system can reach about 2,000 psi to about 5,000 psi or higher, upon production of the gas through continuously electrolyzing water. The pressure inside and outside of the reservoir is balanced. The produced hydrogen gas fills a hydrogen chamber 60 over the reservoir 44, through the conduit loop 18 and the hydrogen return port 30 (FIG. 1A). The hydrogen chamber 60 is provided between the vessel case 22 and the electrolyzer unit 43 and contains the reservoir 44 and its housing 68 (see also, FIG. 9C). The hydrogen chamber 60 is in fluid communication with the outer surface of the reservoir 44 through one or more ports 68a in the reservoir housing 68. In some implementations, the reservoir 44 is a collapsible reservoir, e.g., a bladder made of rubber material, so that as water is consumed in the electrolyzer chamber 42 for electrolysis, the reservoir 44 collapses to follow the volume change of the water forcing more water into the chamber 42. Similarly, an oxygen chamber 61 is provided to receive oxygen that results from electrolysis. The oxygen chamber is also high pressure (e.g., same pressure as the hydrogen chamber). An $O_2$ release value is controlled to release pressure according to sensed pressure in the chamber. Thus, various pressure sensors (as indicated in FIG. 2A by the item "S") are shown disposed in the various chambers such as chambers 60 and 61 to sense gas pressures, as well as the reservoir 44 to sense water pressure. Other sensors (to sense gas and/or water) can be included in various parts of the device 10 such as in the compartments 48a, 48b, etc. These sensors feed signals via conductors or the like (not shown) to a controller (FIG. 11).

In the example shown in FIG. 2A, a spring 70 is placed between the reservoir housing 68 and the reservoir 44 to apply a compressive force to the water to continually replenish water to the electrolysis chamber 42 as the water is consumed. Units different from that shown in FIG. 2A can also be used. For example, the reservoir 44 and the hydrogen chamber 42 can be arranged differently, e.g., to accommodate reservoirs 44 having different sizes for storing desired amounts of water for electrolysis. The spring force is chosen according to the pressure at which water is introduced into the electrolyzer 12. In general, the pressure exerted by the water would need to overcome the force applied to the reservoir 44 by the spring.

In some implementations, the parts of the systems shown in FIGS. 1A and 2A can be alternatively configured.

Figure 1B:
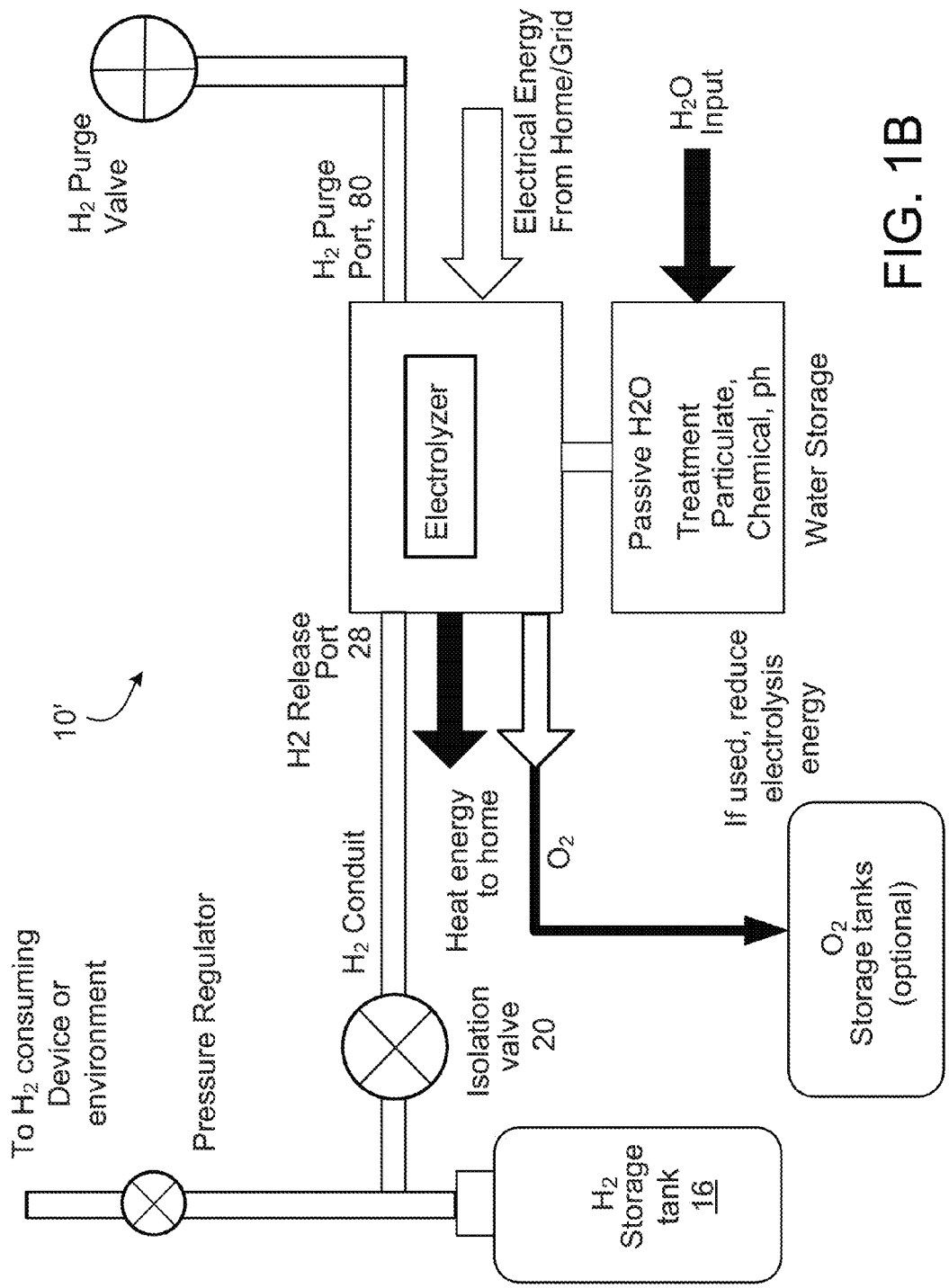
Figure 2B:
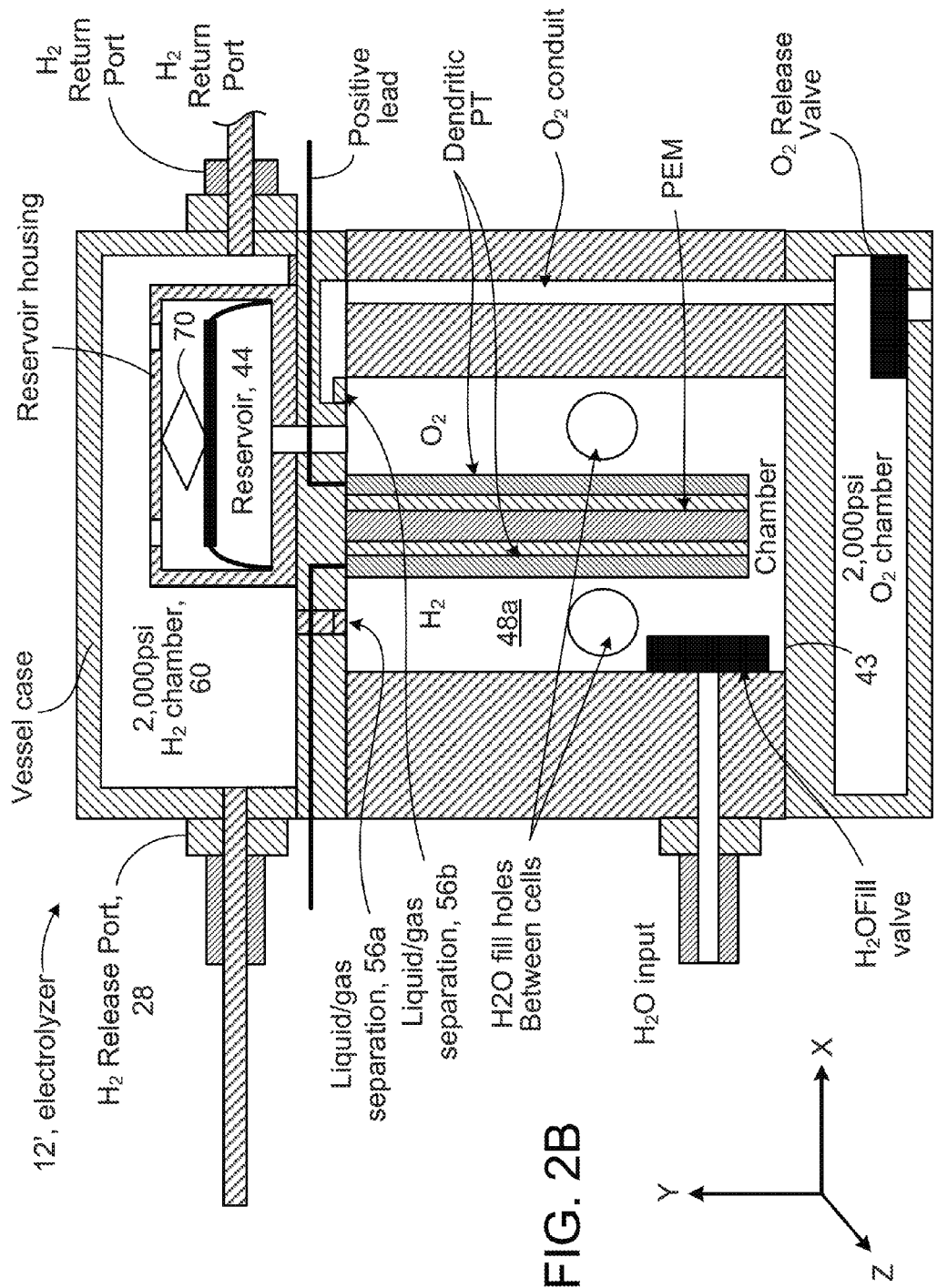

Referring now to FIGS. 1B and 2B, an alternative arrangement is shown. This alternative system 10″ does not include the conduit loop 18 of FIG. 1A for feeding the hydrogen gas back into the pressure vessel case in order to balance the inside and outside pressures of a reservoir (as was shown in FIGS. 1A and 2A). The alternative system 10′ includes an electrolysis unit within an electrolyzer 12′ that is similar in construction to electrolyzer 12 (FIG. 2A). In FIG. 2B, the compartment 48a is coupled through the liquid/gas separator 58a to the high pressure hydrogen chamber 60 by a conduit. Thus, hydrogen from electrolysis fills the $H_2$ chamber 60 directly, as shown.

In FIGS. 1A, 1B, 2A and 2B, balancing of the pressure inside and outside the reservoir is achieved by controlled venting of oxygen gas from the $O_2$ release valve 53. The pressure in the $O_2$ chamber is balanced to the $H_2$ chamber 60 in this manner. The hydrogen gas within the hydrogen storage chamber 60 is further delivered through the hydrogen release port 28 to a hydrogen storage tank 16. Other items in FIGS. 1B and 2B are as the respective descriptions for FIGS. 1A and 1B.

In particular, compared to the systems shown in FIGS. 1A and 2A, the conduit inside the vessel case 22 between the hydrogen exit port of the electrolysis unit and the hydrogen release port on the pressure vessel case is removed. In addition, a hydrogen purge port 80 is used to reduce the pressure inside the pressure vessel case 22 and the electrolyzer unit 43 during the storage state, e.g., for a long time, of the system 10 when the isolation valve 20 is closed.

Figure 3:
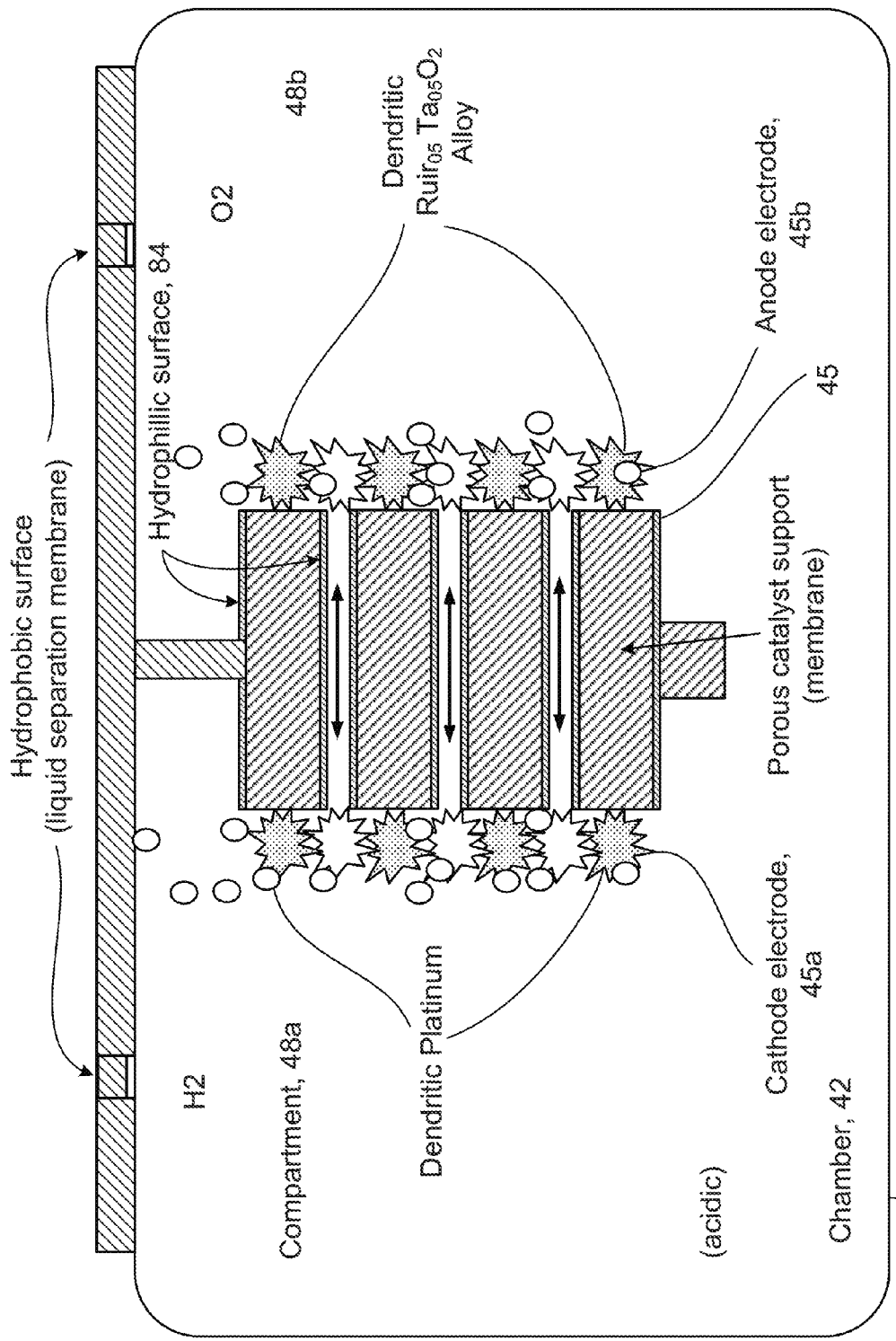
FIG. 3 is a block diagram showing an ion exchange structure.

Referring now to FIG. 3, an example arrangement of the ion exchange structure 45, cathode 45a, and anode 45b within an electrolysis unit of the electrolyzer 12 is shown. One or more catalysts, such as platinum, are disposed on the porous ion exchange structure 45 to facilitate the electrolysis and provide a path for the electrons. Furthermore, the ion exchange structure 45 can be coated with a material, e.g., by surface treatment of the silicon, to provide hydrophilic surfaces 84 to attract water into the ion exchange structure and enhance the electrolysis process. The cathode and the anode 45a, 45b can be in the form of dendrites, e.g., branched projections from the metal core on the ion exchange structure to increase surface area. In some implementations, the cathode can be formed of "dendritic platinum" and the anode can be formed of "dendritic" $RuIr_{0.5}Ta_{0.5}O_2$ alloy. Other suitable materials such as both electrodes being platinum as well as other materials can also be used. In some implementations, the PH of the water in the chamber is adjusted to be acidic to provide efficient electrolysis.

The hydrogen and oxygen compartments 48a, 48b are separated by the ion exchange structure 45 but not sealed by it, since there is a gap at the bottom of the ion exchange structure. This gap functions to equalize the pressure in both compartments thus substantially minimizing any lateral flow (crossover) of hydrogen or oxygen across and underneath the ion exchange structure. The gap also provides an additional path for ions. In use, a substantial amount of the produced hydrogen gas and oxygen gas separately permeate the respective liquid-gas separators without substantial mixing of the two types of gas.

Figure 4A:
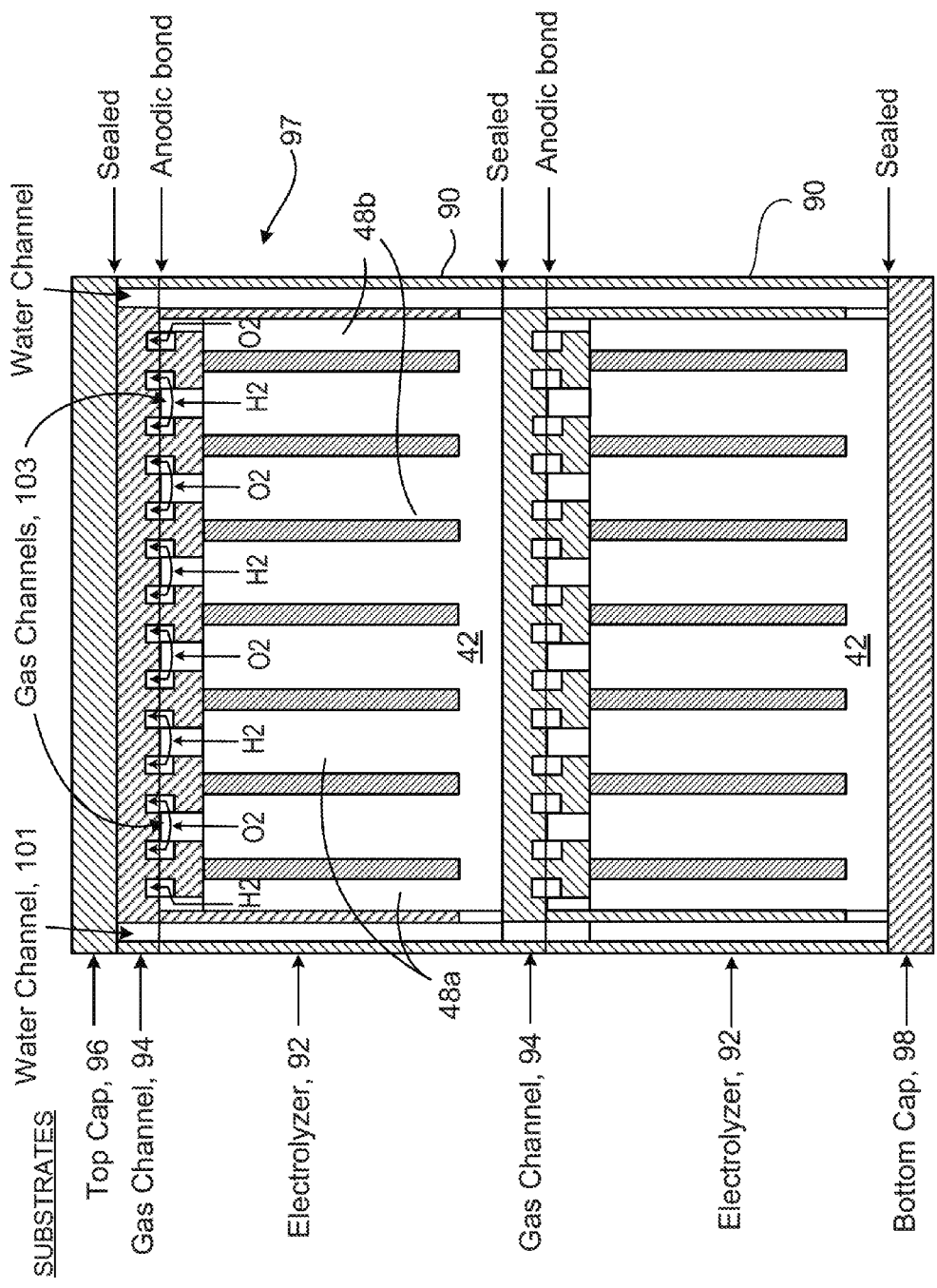
FIG. 4A is a schematic cross-sectional view of an electrolysis stack.
Figure 4B:
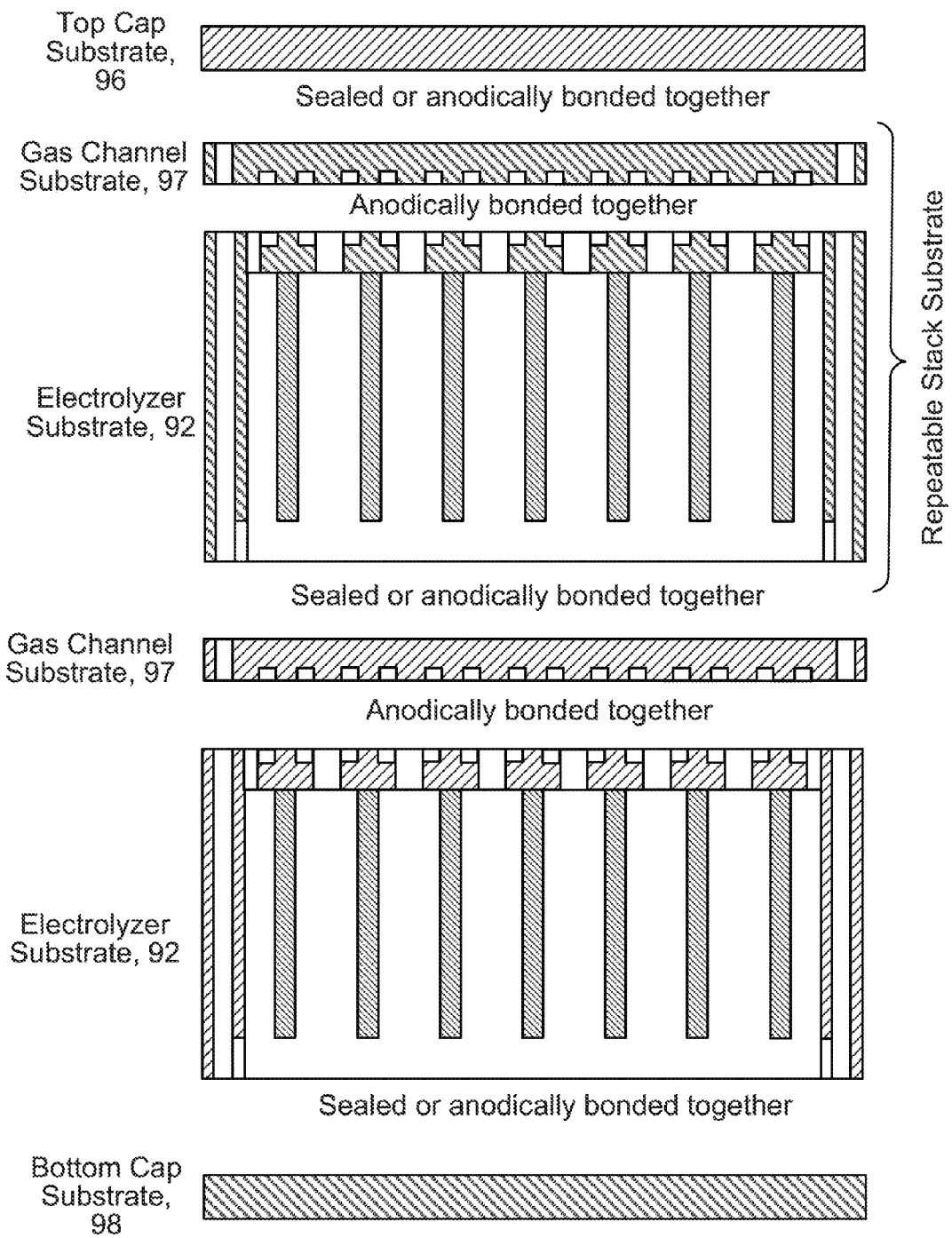
FIG. 4B is a schematic cross-sectional view of parts of an electrolysis stack.

Referring to FIGS. 4A and 4B, an electrolysis unit 43 configured as an electrolysis stack (for placing in a high strength pressure vessel case to provide the electrolyzer 12) includes one or more (two shown) stacks 90 each stack 90 including an electrolyzer substrate 92 bonded, e.g., anodically bonded 91, to a gas channel substrate 94. Each electrolyzer substrate 92 has multiple electrolyzer units 43 with multiple electrolyzer chambers 48a, 48b. When multiple stack 90 are stacked along the y direction, the surface of an electrolyzer substrate in one stack substrate bonds to a surface of a gas channel substrate in an adjacent stack substrate. The electrolysis stack also includes a top cap substrate 96 and a bottom cap 98 substrate that caps the electrolysis stack(s) 90 on opposite ends. Each of the electrolyzer substrates, gas channel substrates, top cap substrate, and bottom cap substrate can be formed in separate silicon wafers, e.g., single crystal silicon wafers. Different substrates are bonded using anodic bonding (or direct silicon bonding). The materials, structures, and bonding of the electrolysis stack can withstand a high internal pressure, e.g., in the electrolyzer chamber or elsewhere, up to about 10,000 psi.

In the example shown in FIGS. 4A and 4B, each electrolyzer substrate 92 is bonded to a gas channel substrate 94 to form a single stack substrate 97. One or more of these stack substrates 97 can be stacked together to increase electrolysis capacity and then capped with a top 96 cap substrate and a bottom cap substrate 98. Additional stack substrates 92 can be included between the top cap 96 and bottom cap substrates 98 (y direction). Other substrates can be stacked along a direction perpendicular to the paper (z direction) and/or along the x direction. Each stack substrate 97 includes electrolyzer chambers 42 each having connected compartments 48a, 48b separated by an ion exchange structure.

Water can be filled through aligned water channels 101 having an opening in the top cap substrate to all compartments of the chambers in all stacked electrolyzer substrates. The hydrogen gas and oxygen gas flow from the chambers through designated gas channels 103 in the gas channel substrates 97 (details discussed below).

Figure 5A:
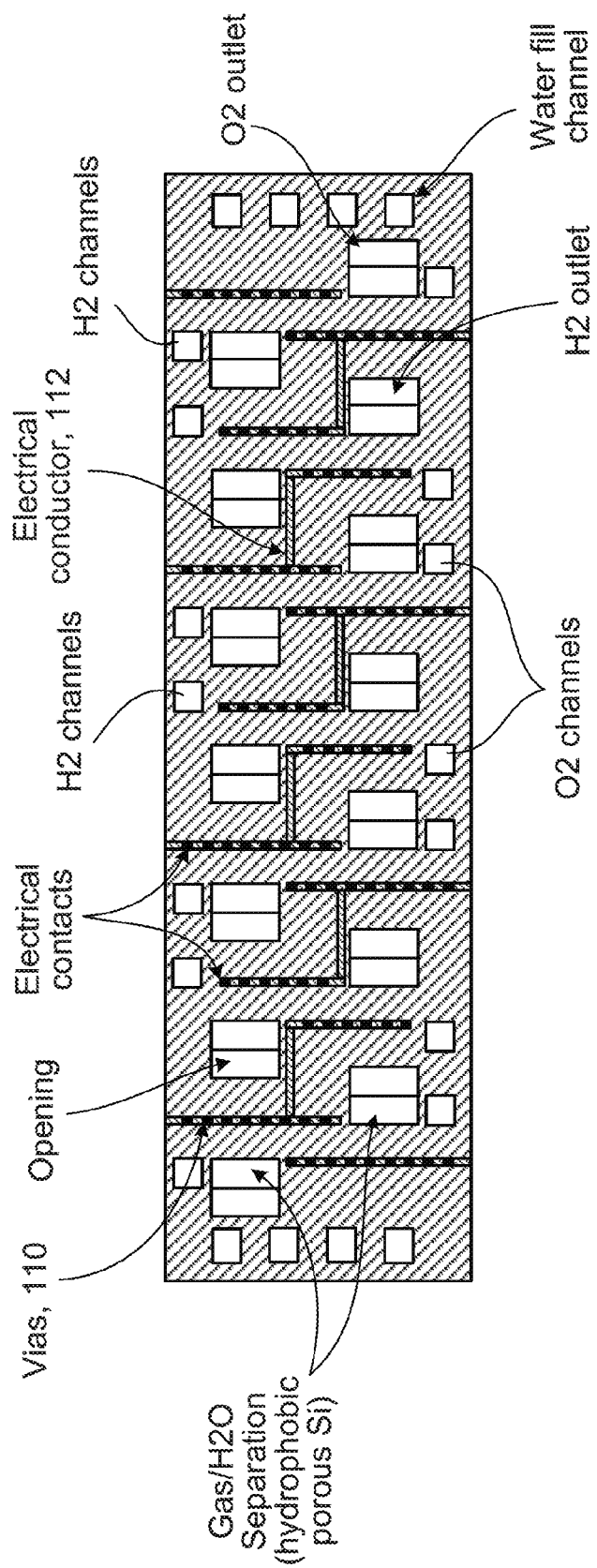
FIGS. 5A-5C are schematic bottom, cross-sectional, and top views of an electrolyzer substrate.
Figure 5B:
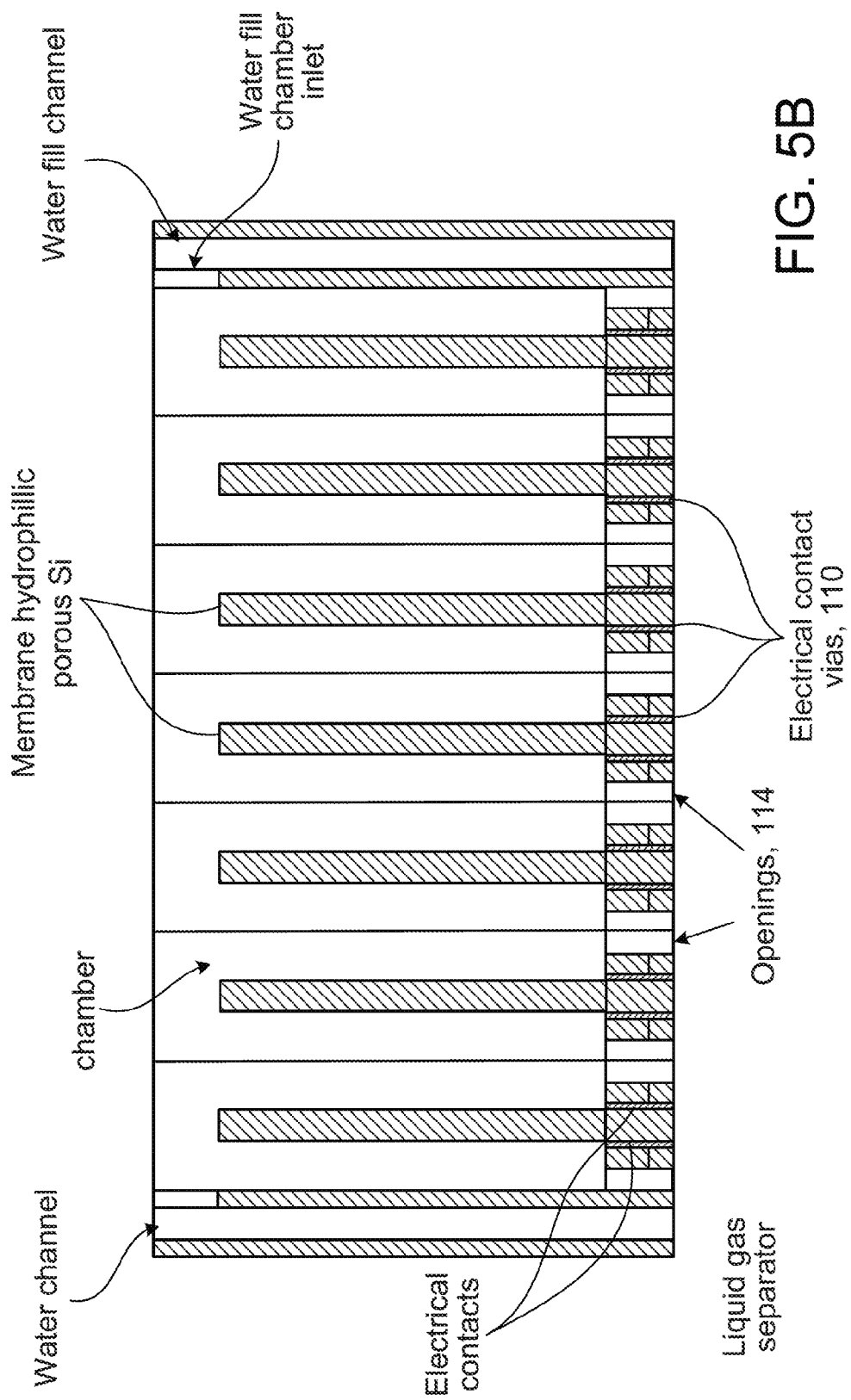
Figure 5C:
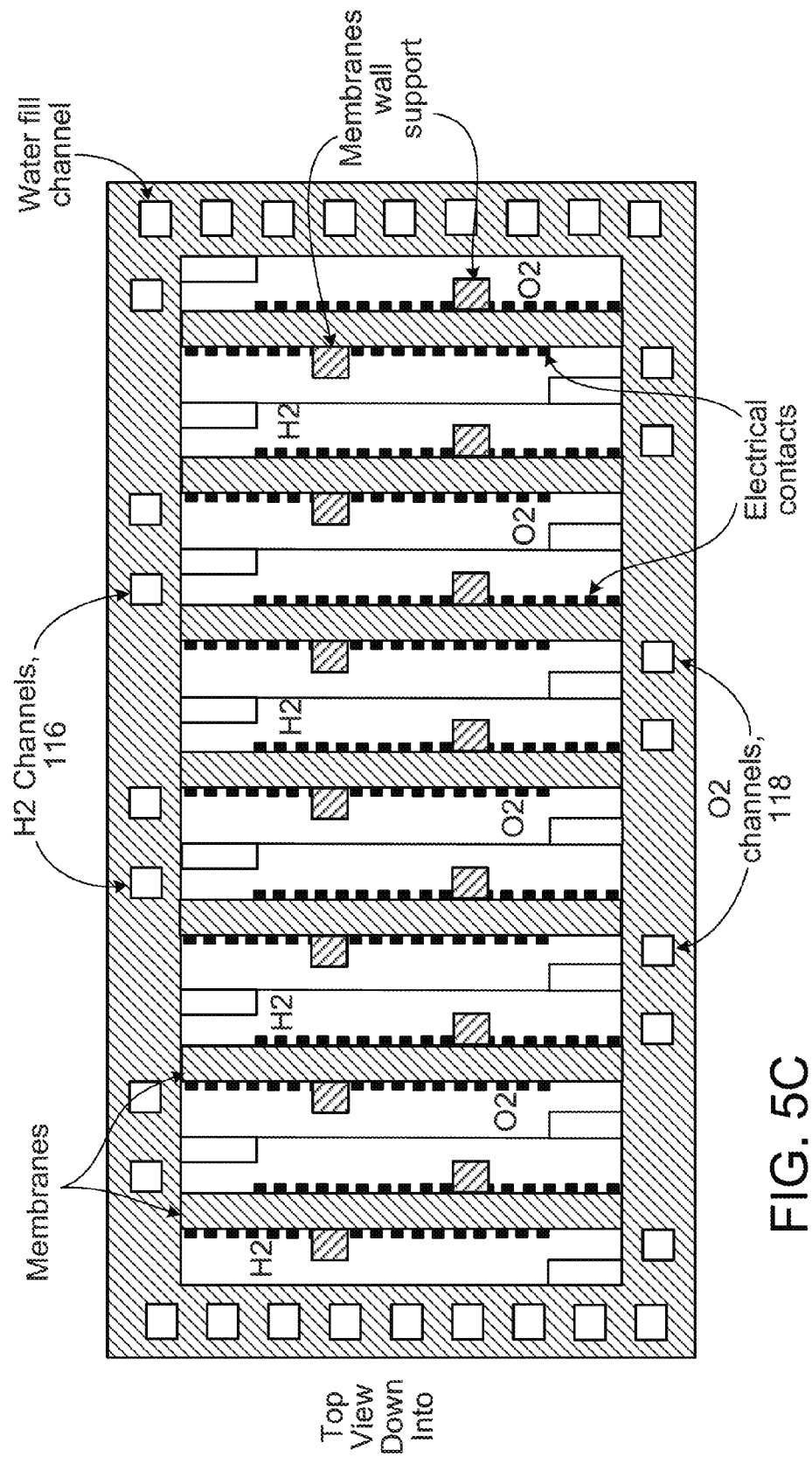

Referring to now FIGS. 5A-5C, the electrolyzer chamber 42 and chamber compartments 48a, 48b of the electrolyzer substrate 92 of FIGS. 4A and 4B are formed by etching a single crystal silicon wafer (not shown). As would be understood, plural of such electrolyzer chambers 42 can be fabricated as die from a silicon wafer. The walls defining the water channels, gas channels, or other channels/compartments, and the ion exchange structures are masked while the other parts of the wafer are removed by etching. In some implementations, additional membrane wall supports are formed along the membranes (FIG. 5C). The ion exchange structures can be further etched to become porous, e.g., using conventional etching techniques. In some implementations, the ion exchange structures are treated to be hydrophilic. In addition, the liquid-gas separators are formed as hydrophobic porous silicon by, e.g., etching.

Metal layers, i.e., anodes and cathodes, can be formed as connected dendrites along the ion exchange structure using deposition or plating techniques. At the base of the ion exchange structures, vias are embedded in the electrolyzer substrate to convey electrons from the electrodes of the ion exchange structure to electrical busses that are used to wire the electrolyzing system. The vias are made using semiconductor fabrication processes and have a very low electrical resistance. The vias are distributed along a surface of the ion exchange structure substantially evenly.

In the example shown in FIG. 5A, conductive vias 110 (and therefore, electrodes) of different ion exchange structures are serially connected using electrical connections 112 formed of a conductive, e.g., metal, material. In such an arrangement, the total voltage applied to the electrolyzer can be substantially evenly divided to each unit (containing one ion exchange structure, an anode, and a cathode). The total voltage can be chosen based on the desired unit voltage. In some implementations, each unit voltage is about 1.4 V-1.7 V. The units can also be electrically connected in parallel. In other implementations, a number of the electrolyzing units can be electrically connected serially and multiple groups of the serially connected electrolyzing units can be connected in parallel. Examples of configurations are shown in FIG. 10.

In use, as explained previously, hydrogen gas and oxygen gas are formed on the cathode and anode sides of the ion exchange structures, respectively. The produced gas flows along a direction indicated by the arrows shown in FIG. 5B. In particular, the gas flows upwards along the ion exchange structures into openings 114 formed in the substrate. The openings 114 are sealed by the gas channel substrate (see, e.g., FIG. 4 and FIG. 6B below), forcing the gas to pass through the liquid-gas separators to exit the substrate into the gas channel substrate. The $H_2$ channels 116 and $O_2$ channels 118 (FIG. 5C) are vertical channels that run through the stack of substrates from top to bottom and connect to every electrolyzer substrate in the stack.

Figure 6A:
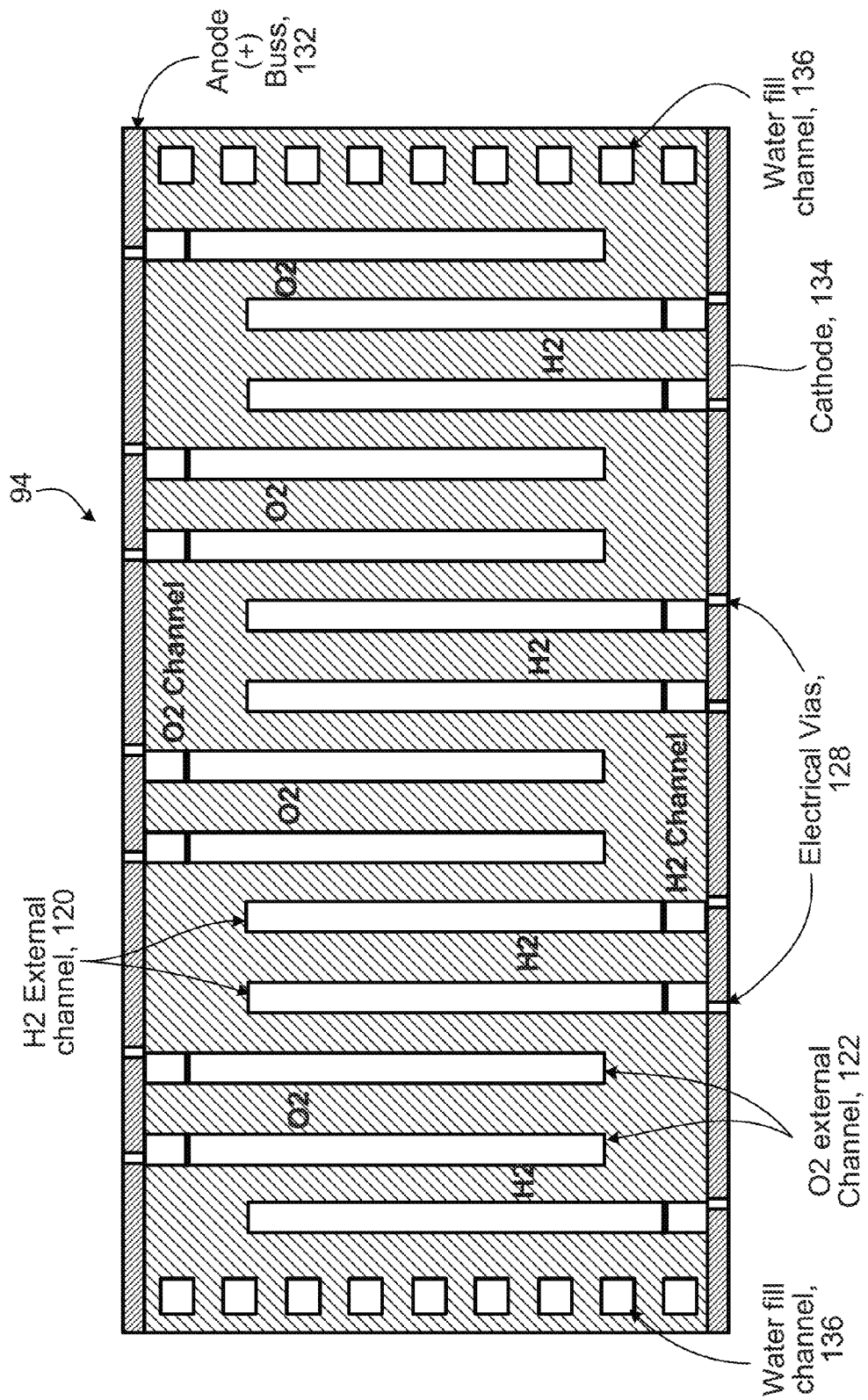
FIGS. 6A-6B are schematic top and cross-sectional views of a gas channel substrate.
Figure 6B:
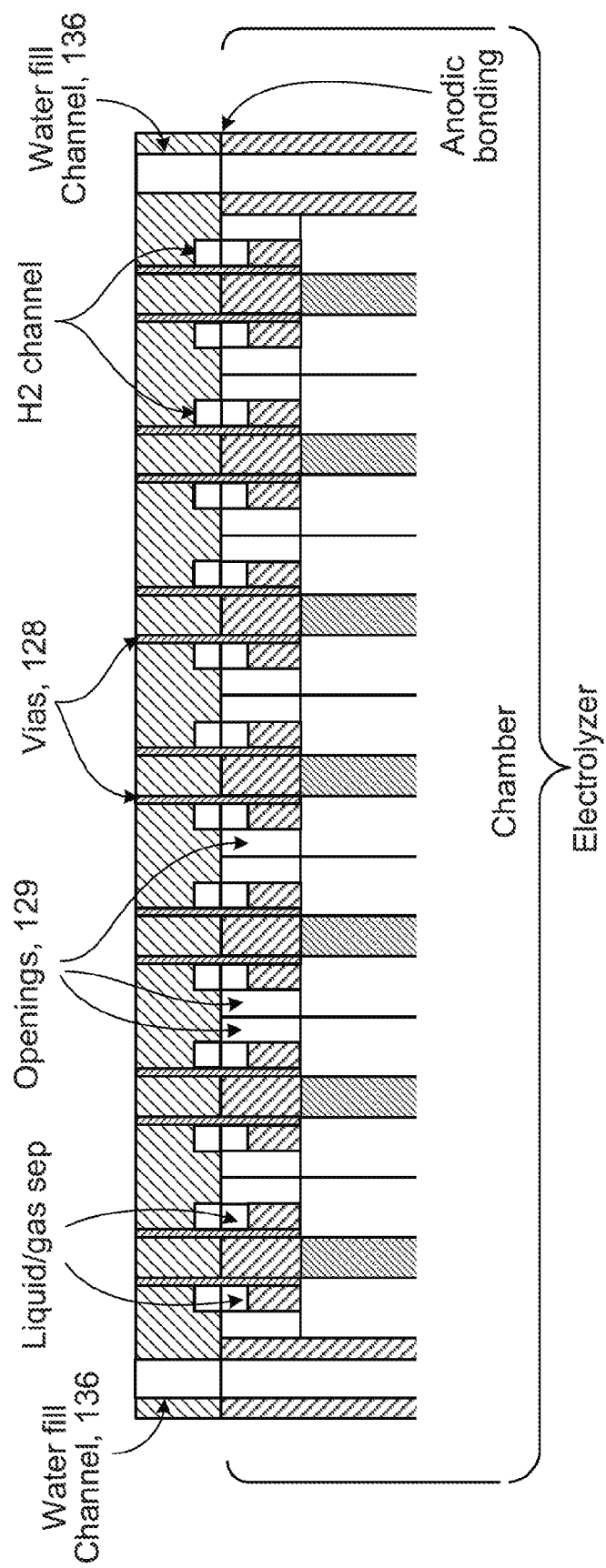

Referring to FIGS. 6A and 6B, the gas channel substrate 94 is also formed in a single crystal silicon wafer and is bonded to the electrolyzer substrate (FIGS. 5A-5C) using anodic bonding. The gas channel substrate 94 includes hydrogen and oxygen gas channels 120, 122 that, when bonded to the electrolyzer substrate 92, are in fluid communication with the liquid-gas separators in the electrolyzer substrate 92 to receive the produced gas from the electrolyzer substrate 92.

As shown in FIG. 6A, on the top surface of the gas channel substrate 94, extended hydrogen and oxygen channels in communication with the hydrogen and oxygen channels are formed. Gas (hydrogen and oxygen) delivered from the liquid-gas separator reaches the respective gas extended channels (hydrogen gas channels and oxygen gas channels) in the gas channel substrate and spreads into the (vertical) gas channels. The extended hydrogen and oxygen channels increase the cross-sectional areas of the gas delivery channels and can facilitate gas delivery between the electrolyzing system and the storage tank.

The gas channel substrate also includes electrically conductive vias 128 that, when bonded to the electrolyzer substrate, are in electrical contact with the vias 110 in the electrolyzer substrate. One or more anode busses 132 or cathode busses 134 are formed on the gas channel substrate, e.g., of a metal, to provide the electrolyzer with connections to external electrical sources. In addition, the gas channel substrate includes water channels 136 that, when bonded to the electrolyzer substrate, are in fluid communication with the water channels 101 in the electrolyzer substrate. Water is filled through the water channels in the gas channel substrate to the water channels of the electrolyzer substrate. Openings 129 are shown that mate with openings 119 in the substrate 92.

Figure 7A:
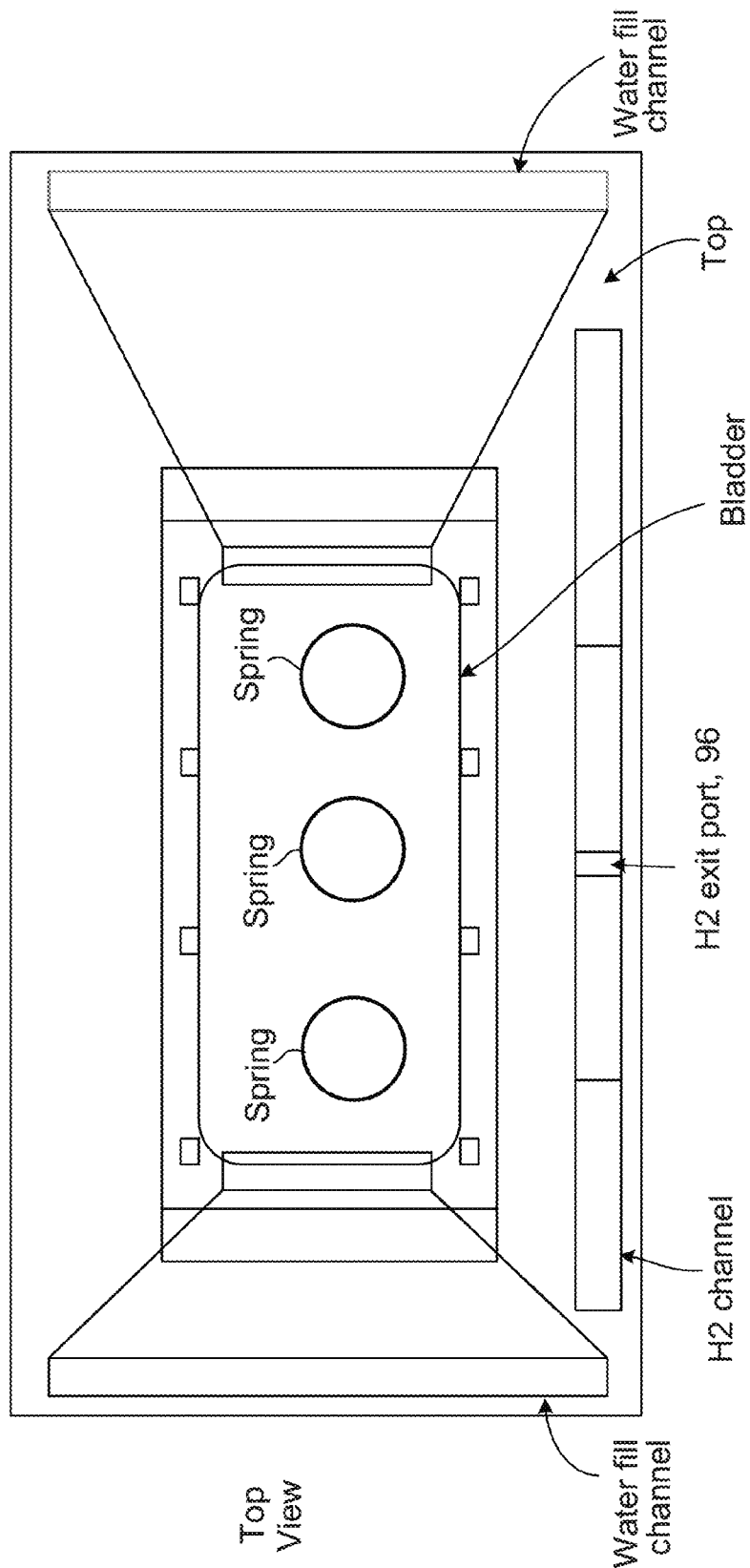
FIGS. 7A-7B are schematic top and cross-sectional views of a top cap substrate.
Figure 7B:
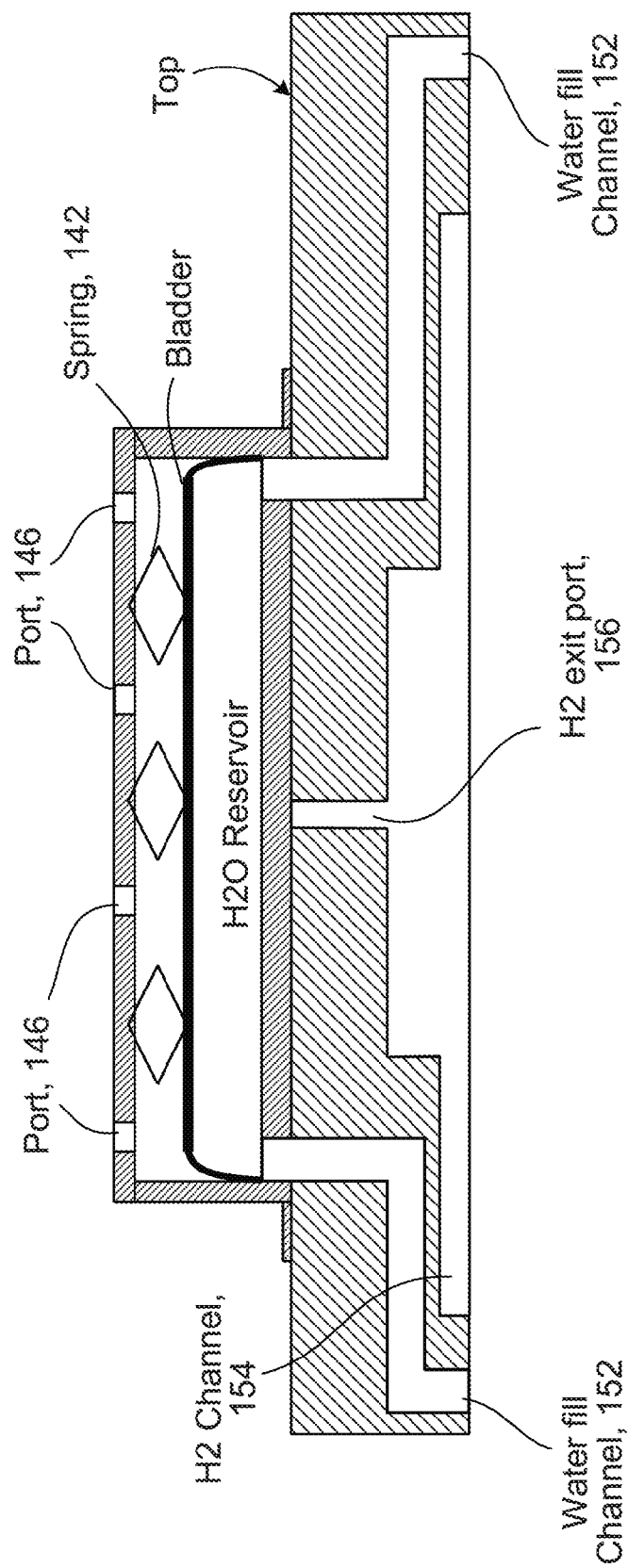

Referring to FIGS. 7A-7B, the top cap substrate 96 is attached to the gas channel substrate (not shown) of the top most stack substrate (not shown). The top cap substrate 96 supports a reservoir housing 142 enclosing reservoir 144 provided by, e.g., a silicon rubber bladder. The housing 142 can be provided by forming a metallic layer on an outside part of the top cap substrate and soldering a metal member onto the top cap substrate. Alternatively, the housing could be mounted to the high pressure vessel case, in the hydrogen storage chamber. The reservoir housing 142 includes one or more ports 146 that keep pressure inside the housing 142 and the pressure outside the housing 142 the same.

One or more springs 148 (three shown) are placed between the reservoir 144 and the reservoir housing 142 to compress the water reservoir and force water out of the bladder as it is being consumed in the electrolyzer chamber 42 during electrolysis. The spring force is selected such that water can be filled into the reservoir from, e.g., a domestic water source. For example, when the water source is domestic water supply, the spring force is chosen so that the pressure at which water is filled into the reservoir (e.g., domestic water pressure at 60 psi) can overcome the spring force to allow the reservoir to be filled with water through one or more water channels 152 in the top cap substrate 96. During electrolysis, the water in the reservoir is delivered into the electrolyzer chamber through the water channels in the top cap substrate.

In addition, the top cap substrate also includes hydrogen channels 154 that, when bonded to the top most gas channel substrate, are in fluid communication with the hydrogen channels and hydrogen extended channels in the gas channel substrate (FIG. 6A). Hydrogen flows from the hydrogen channels 154 of the top cap substrate 96 at a hydrogen exit port 156 to the hydrogen release port 32 in the high pressure vessel case (see, e.g., FIGS. 1A). The hydrogen release port delivers generated hydrogen for storage and other uses.

Figure 8A:
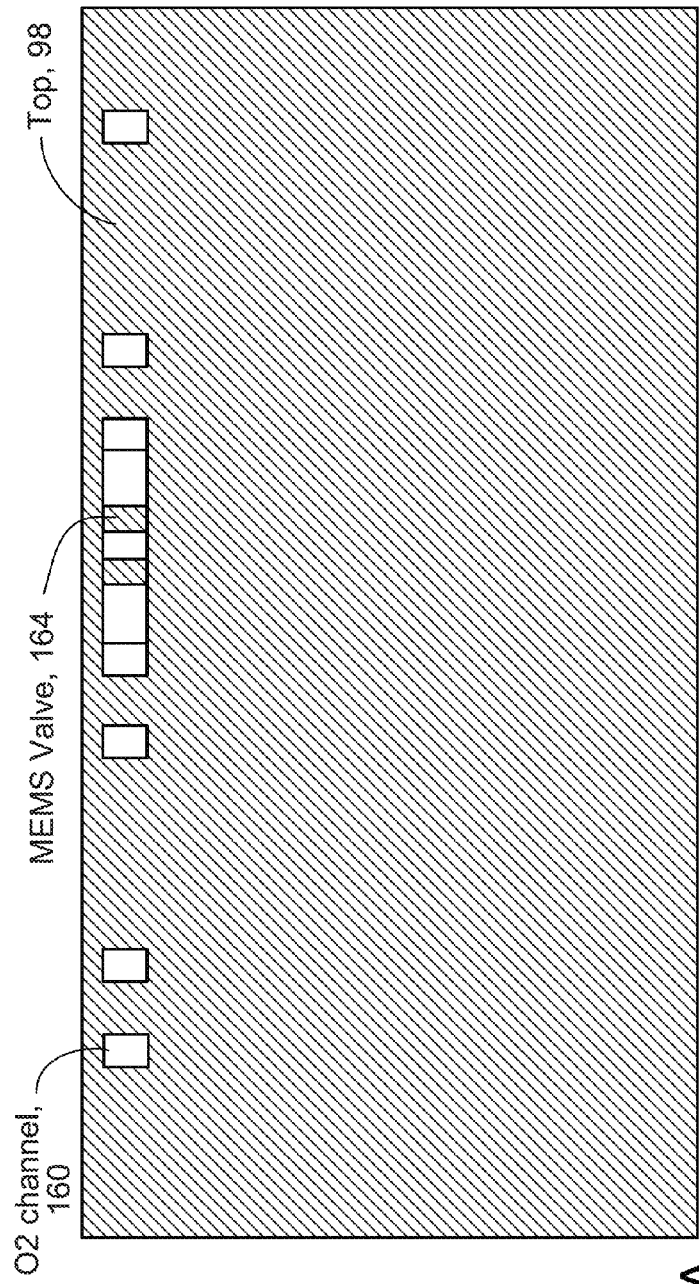
FIGS. 8A-8B are schematic top and cross-sectional views of a bottom cap substrate.
Figure 8B:
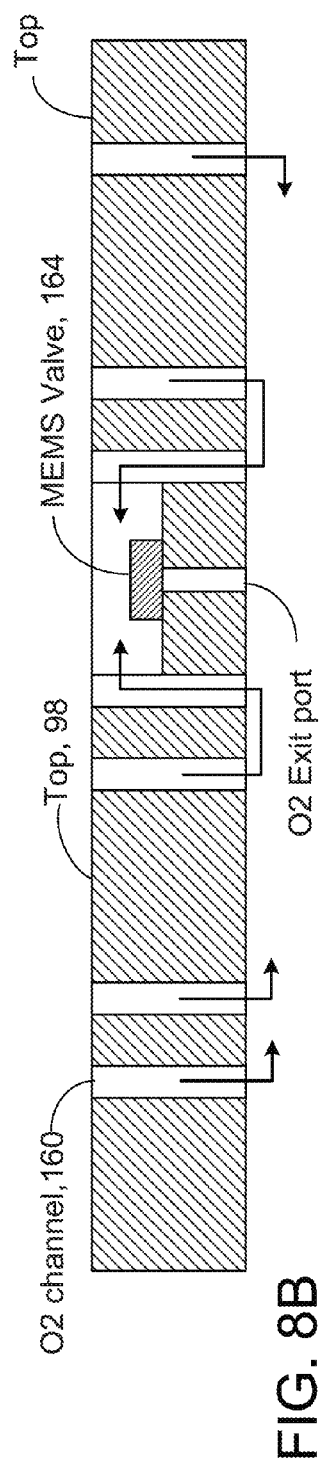

Referring to FIGS. 8A-8B, the bottom cap substrate 98 is attached, e.g., bonded, to the bottom most electrolyzer substrate 92 of the electrolyzer unit 43, i.e., on the opposite surface of electrolyzer 92 to which the top cap substrate 96 is bonded. When the substrates 92 and 98 are bonded, oxygen channels 160 in the bottom cap substrate 98 are in communication with the oxygen channels in the electrolyzer substrate 92. When an electrolyzer unit 43 is disposed in the high pressure vessel (discussed later), oxygen gas from the electrolyzer substrate 92 flows through the bottom cap substrate 98, as shown by the arrows in FIG. 8B. A MEMS (micro-electro-mechanical) valve 164 regulates the release of the oxygen from the space between the vessel case and the electrolysis stack ($O_2$ chamber), through the oxygen exit port to the external environment. The valve 164 is closed or opened to adjust the oxygen pressure within the electrolyzer unit so that the oxygen pressure is balanced with the hydrogen pressure to maintain proper functioning and protection of the liquid-gas separators.

As previously discussed (e.g., with FIGS. 2A and 3), the difference between hydrogen pressure and oxygen pressure across the ion exchange structure is maintained to be substantially zero. For example, as the hydrogen pressure increases (e.g., because of generation) or decreases (e.g., because of consumption), the pressure of the oxygen is regulated by venting the oxygen using the MEMS valve 164 in a controlled manner.

Figure 9C:
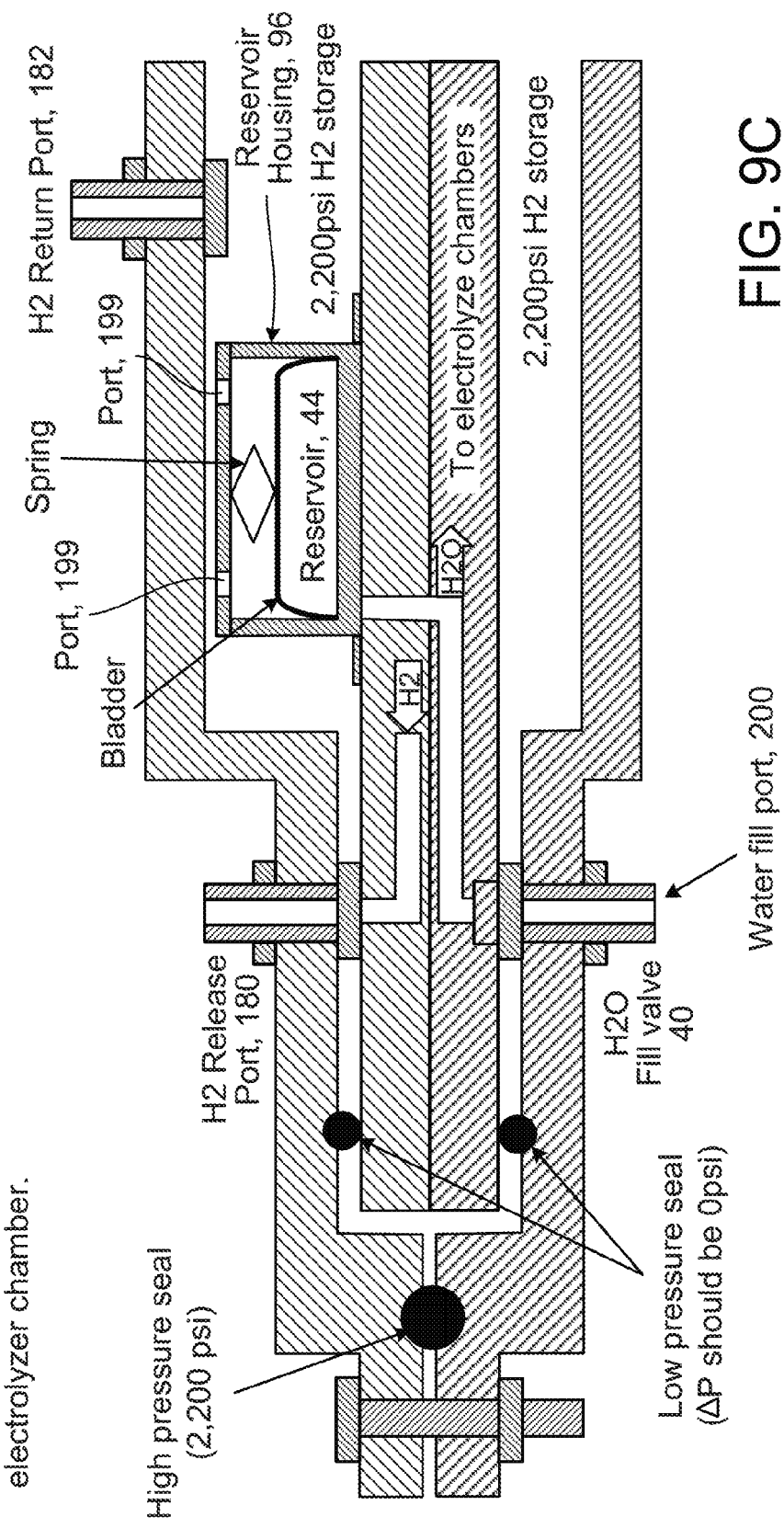

Referring to FIGS. 9A-9C, the electrolyzer unit comprised of the parts described in FIGS. 4A-4B, 5A-5C, 6A-6B, 7A-7B, and 8A-8B is sealed in a pressure vessel case 22. The cross section of the pressure vessel case 22 can be in any shape, e.g., rectangular, oval, cylindrical, or circular. A rectangular shaped case is shown. However, circular shapes may be preferred because they tend to be able to withstand high pressures better than oval, which tends to be better than rectangular. The vessel case can include multiple pieces, e.g., a top case portion 172 and a bottom case portion 174 that are bolted together. The vessel case portions 172 and 174 are sealed together to isolate produced hydrogen and oxygen gas from the external environment. Sealing is provided by, e.g., one or more O-rings 176 or interference fit metal surfaces or other techniques. The vessel case 22 can be metallic and, together with the O-rings 176 is configured to withstand high internal pressures, e.g., about 2,000 psi to about 5,000 psi or about 2,200 psi. In some implementations, the vessel case 22 and the O-rings 176 can withstand twice the operating pressure of the electrolysis system 10 for safety. In addition, electrical connections 171, e.g., leads connecting the electrical busses of the gas channel substrate (see, e.g., FIG. 6A) and external electrical sources, passes through the vessel case.

Referring in particular to FIG. 9C pressure vessel includes a hydrogen release port 180 connected to the hydrogen exit port 156 in the top cap substrate 96 for delivering hydrogen to the storage tank, and a hydrogen return port 182 that is in fluid communication with the hydrogen release port 180 and the reservoir 44 in the top cap substrate. In particular, the hydrogen return port 182 fills a hydrogen storage space between the vessel and the reservoir ($H_2$ chamber) with hydrogen having the same pressure, e.g., 2,200 psi, as the hydrogen within the electrolyzer chambers (not shown). The hydrogen in the hydrogen storage space enters into the reservoir housing 96 through ports 199 in the housing 96 and balances the pressures inside and outside the water reservoir 44. Other configurations between the reservoir and the $H_2$ storage space can be used, e.g., to accommodate a desired size of the reservoir for storing a desired amount of water.

Between the pressure vessel bottom case portion 176 and the electrolyzer unit 43 there is also an oxygen storage space ($O_2$ chamber) that is sealed from the hydrogen storage space using low pressure seals. The oxygen pressure in the oxygen storage space can be controlled to be substantially the same as the hydrogen pressure in the hydrogen storage space.

The pressure vessel case 22 also includes water fill valve 40 and a water fill port 200 and also can include a water purge valve and port (not shown). When the water fill valve 40 is open, water is filled through the water fill port 200 into the water channels, the reservoir 44 and the electrolyzer unit 43 at a pressure of about 60 psi.

Referring back to FIG. 9B, the vessel case 22 also has an oxygen release port 204 controlled by an oxygen release valve 206. Oxygen in the oxygen storage space is directly released to an external environment. In some implementations, the generated oxygen can also be stored in a manner similar to that of hydrogen for use, e.g., delivered to an oxygen storage tank. Use of stored oxygen along with the hydrogen can increase the efficiency of a fuel cell that consumes the gas to produce electrical power. Other than the hydrogen return port, the other ports, i.e., the hydrogen release port, the oxygen release port, and the water fill port are isolated from the spaces between the pressure vessel and the electrolysis stack.

The electrolysis stack 12, as well as the pressure vessel case 22 can be sized according to a rate that hydrogen is produced and a desired maximum operating pressure. The substrates of the electrolyzer units 43 are provided in silicon wafers that are cut into dies having various dimensions.

Referring to FIG. 10, in one example, 353 electrolyzing units (N) are serially connected as a group (G) and ten of such groups (G to G+9) are connected in parallel. When a source current is 20 A, the source voltage is 600 V and the source power is 12 KW. Each electrolyzing unit (N) has a voltage of about 1.7 V applied in order to carry out the electrolysis process. The units (N) can also be wired under dynamic control that allows the system to reconfigure to varying electrical input power, e.g., from a renewable energy source, such as wind or solar or as the system's temperature changes.

Referring to FIG. 11, a user can interact with the electrolysis system 10 through a user interface (not shown). Various types of user interfaces can be used. For example a graphical user interface produced by a controller and rendered on a display can be used.

The electrolysis system 10 includes a controller as well as memory and input/output ports. Suitable controllers can include a micro-controller, a processor or other type of computing device, and can include a computer. The sensors (mentioned in FIG. 2A and included in all embodiments), such as hydrogen pressure sensor in the hydrogen storage space, oxygen pressure sensor in the oxygen storage space, and water pressure sensor in the water reservoir are disposed in the electrolyzing system 10 or 10" to facilitate the automatic control of the system. In some implementations, the sensors are powered by the same external power source that provides power to the electrolyzer chamber. The controller automatically controls valves, e.g., the isolation valve, the water fill MEMS valve, the oxygen release MEMS valve, etc. for controlling the release/ delivery of the hydrogen and oxygen gas. The controller automatically controls the system 10 based on, e.g., the sensors' output.

The electrolysis system 10 can work on a daily basis repeatedly, although it can be operated on a longer time basis if desired. For example, the system operates for six hours during the off peak hours (late night/early morning) to electrolyze about eleven liters of water, place the generated hydrogen in a tank, and release the oxygen (although the oxygen can also be put in a tank if desired). The hydrogen is stored at high pressure, e.g., about 2,000 psi to about 5,000 psi, without any compressor between the electrolyzer and the storage tank. The stored hydrogen can be used in a PowerNode™ Encite, LLC (e.g., a hydrogen/air fuel cell) to provide electricity the following day during the electricity peak load period.

Referring to FIG. 12, the electrolysis system 10 can be operated in the following manner. The electrolysis system 10 is filled with water. In an illustrative example, the electrolysis system 10 is filled with about eleven liters of treated water. The electrolysis system 10 electrolyzes the water to produce hydrogen and oxygen. As the electrolysis system 10 electrolyzes the water, the system stores the hydrogen (and oxygen if desired) and the system once all of the water has been electrolyzed goes into a dormant state and remains dormant until hydrogen starts being used. The system maintains a pressure balance across the proton exchange membranes during use. In addition, when power is not available to the electrolysis system 10, the system enters an off state and waits until power is again available, e.g. during off peak periods (or sunlight or wind return) to begin the cycle again.

The controller is implemented in digital electronic circuitry or in computer hardware, firmware, software, or in combinations thereof. Apparatus can include a computer program product tangibly embodied in a computer-readable storage device for execution by a programmable processor. The controller can be implemented using suitable processors that include, by way of example, both general and special purpose microprocessors. Generally, a processor will receive instructions and data from a read-only memory and/or a random access memory. Storage devices suitable for tangibly embodying computer program instructions and data include all forms of memory, including by way of example semiconductor memory devices, such as EPROM, EEPROM, RAM and flash memory devices. In addition, magnetic disks such as internal hard disks and removable disks; magneto-optical disks; and CDROM disks could be used. Any of the foregoing can be supplemented by, or incorporated in, ASICs (application-specific integrated circuits). In some implementation the execution environment can include an operating system.

What is claimed is:

1. A device for electrolyzing water, the device comprising:
an electrolysis unit, comprising:
a chamber;
an ion exchange structure in the chamber, the ion exchange structure comprising:
an ion exchange member that is configured to separate the chamber into a first compartment and a second compartment;
a cathode disposed on a first surface of the ion exchange member, which first surface is in the first compartment; and
an anode disposed on a second, different surface of the ion exchange member, which second surface is in the second compartment;
a case at least partially enclosing a high pressure chamber that receives hydrogen gas through a passage between the high pressure chamber and the first compartment, which hydrogen gas resulting from the electrolysis of water in the ion exchange structure; and
a reservoir comprising a reservoir housing that is disposed in the high pressure chamber, which reservoir is in fluid communication with the chamber of the electrolysis unit, and the reservoir configured to store the water that is supplied to the chamber of the electrolysis unit.

2. The device of claim 1 wherein the ion exchange structure includes a proton exchange membrane.

3. The device of claim 1 wherein the ion exchange structure is a first ion exchange structure, the device further comprising:
a plurality of ion exchange structures including the first ion exchange structure in the chamber.

4. The device of claim 1 further comprising:
a hydrogen release port in fluid communication with the first compartment.

5. The device of claim 1 further comprising:
an oxygen release port in fluid communication with the second compartment.

6. The device of claim 1 further comprising:
a second high pressure chamber that receives oxygen gas that results from the electrolysis of water in the ion exchange structure, the second high pressure chamber in fluid communication with an external environment.

7. The device of claim 6, further comprising:
a release valve disposed in the second high pressure chamber to control egress of oxygen from the second high pressure chamber to the external environment.

8. A device for use in electrolyzing water, the device comprising:
an electrolysis unit, comprising:
a plurality of substrate stacks, with each stack comprising:
a first substrate having a first chamber, and a channel in the first substrate configured for delivering water to the first chamber;
at least one ion exchange structure in the first chamber, the at least one ion exchange structure comprising:
an ion exchange member that separates the first chamber into a first compartment and a second compartment;
a cathode disposed on a first surface portion of the ion exchange member, which first surface portion is in the first compartment; and
an anode disposed on a second, different surface portion of the ion exchange member, which second portion is in the second compartment;
a gas channel substrate having a first set of channels that collect gas from the first compartment and a second, different set of channels that collect gas from the second compartment, the device further comprising:
a case at least partially enclosing a second chamber that is a high pressure chamber (high pressure chamber), and that receives hydrogen gas from the electrolysis of water in the ion exchange structure, through a passage between the high pressure chamber and the first compartment; and
a reservoir comprising a reservoir housing that is disposed in the high pressure chamber, which reservoir is in fluid communication with the first chamber of the electrolysis unit, and the reservoir configured to store the water that is supplied to the first chamber of the electrolysis unit.

9. The device of claim 8 wherein the reservoir in the high pressure chamber comprises a spring loaded bladder.

10. The device of claim 8, further comprising:
a top cap substrate; and
a bottom cap substrate, with the top and bottom cap substrates being anodically bonded to a corresponding one of the first substrate and the gas substrate covering the chamber.

11. The device of claim 10, further comprising:
a first liquid-gas separator supported by a portion of the second silicon substrate, the first liquid-gas separator being in fluid communication with the first compartment; and
a second liquid-gas separator supported by the second silicon substrate, the second liquid-gas separator being in fluid communication with the second compartment.

12. The device of claim 8, wherein the cathode and the anode are in the form of dendritic metallic layers and the material of the substrate is silicon or a glass or a ceramic.

13. The device of claim 8, further comprising:
a first set of via conductors disposed in the first substrate in electrical contact with the cathodes and a second set of via conductors disposed in the first substrate in electrical contact with the anode.

14. The device of claim 8 wherein the first substrate and the gas channel substrate are comprised of single crystalline silicon.

15. A system comprising:
a device for electrolyzing water, the device comprising:
a reservoir housing enclosing a reservoir for storing water;
a chamber containing an ion exchange structure for electrolyzing the water, the chamber and the ion exchange structure formed integrally in a silicon substrate with the ion exchange structure dividing the chamber into a first compartment that collects hydrogen gas and a second compartment that collects oxygen gas from the electrolysis of water;
a case housing a high pressure chamber and the reservoir housing, with the high pressure chamber configured to receive hydrogen gas through a passage between the high pressure chamber and the first compartment, which hydrogen gas resulting from the electrolysis of water in the ion exchange structure, and with the reservoir having a passage to the chamber in the silicon substrate, the case having a gas release port; and
a storage tank in fluid communication with the gas release port to store hydrogen gas resulting from the electrolysis of water.

16. The device of claim 15, wherein an internal pressure in the high pressure chamber, the reservoir and the storage tank is about 2,000 psi to about 5,000 psi.

17. The device of claim 15, wherein the pressure inside and outside the reservoir and in the case are substantially the same.

18. The device of claim 15, wherein the reservoir for storing water further comprises:
a bladder; and
a spring between the reservoir housing and the bladder.

19. The device of claim 15 further comprising one or more sensors to sense the differential pressure of the chamber compartments.

20. The device of claim 19, further comprising a processor that receives signals from the sensors and with the processor configured to operate and control the device.

* * * * *